US011567504B1

(12) United States Patent
Bai et al.

(10) Patent No.: US 11,567,504 B1
(45) Date of Patent: Jan. 31, 2023

(54) DYNAMIC WAIT LOCATION FOR AN AUTONOMOUS MOBILE DEVICE

(71) Applicant: AMAZON TECHNOLOGIES, INC., Seattle, WA (US)

(72) Inventors: Shi Bai, Sunnyvale, CA (US); Amin Hani Atrash, Los Altos, CA (US); Saurabh Gupta, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/128,785

(22) Filed: Sep. 12, 2018

(51) Int. Cl.
  *G05D 1/02* (2020.01)
  *H04W 4/40* (2018.01)
  *G01C 21/20* (2006.01)
  *G06V 20/10* (2022.01)
  *H04W 4/02* (2018.01)

(52) U.S. Cl.
  CPC ......... *G05D 1/0219* (2013.01); *G01C 21/206* (2013.01); *G05D 1/0246* (2013.01); *G05D 1/0274* (2013.01); *G05D 1/0285* (2013.01); *G06V 20/10* (2022.01); *H04W 4/40* (2018.02); *H04W 4/026* (2013.01)

(58) Field of Classification Search
  CPC .. G05D 1/0219; G05D 1/0285; G05D 1/0246; G05D 1/0274; G06K 9/00664; H04W 4/40; H04W 4/026; G01C 21/206
  USPC .......................................................... 701/24
  See application file for complete search history.

(56) References Cited

U.S. PATENT DOCUMENTS

| 2011/0208357 A1* | 8/2011 | Yamauchi | G05D 1/0251 901/1 |
| 2012/0173018 A1* | 7/2012 | Allen | G05D 1/0248 700/245 |
| 2013/0226344 A1* | 8/2013 | Wong | B25J 9/1697 901/1 |
| 2014/0350839 A1* | 11/2014 | Pack | G05D 1/0274 901/1 |
| 2018/0064024 A1* | 3/2018 | Choi | G05D 1/0274 |
| 2018/0189565 A1* | 7/2018 | Lukierski | H04N 5/23238 |
| 2018/0306587 A1* | 10/2018 | Holz | G01C 21/206 |

OTHER PUBLICATIONS https://www.youtube.com/watch?v=8Yyv_NFvuUs.*

* cited by examiner

*Primary Examiner* — Muhammad Shafi
(74) *Attorney, Agent, or Firm* — Lindauer Law, PLLC

(57) ABSTRACT

A robot that is able to move about an environment determines a wait location in the environment to wait at when not otherwise in use. The wait location may be selected based on various factors including position of objects, next scheduled use, previous usage of the robot, availability of wireless connectivity, user traffic patterns, user presence, visibility of the surrounding environment, and so forth. The robot moves to that location and maintains a pose at that location, such as orienting itself to allow onboard sensors a greatest possible view of the environment. If a wait location is occupied, the robot may move to another wait location.

21 Claims, 9 Drawing Sheets

| PARAMETER 602 | WEIGHT (APPLIED TO PARAMETER VALUES) 604 |
|---|---|
| Occupancy Map | -10 |
| Network Map | 8 |
| Movement Map | 5 |
| Current User Location Map | 3 |
| Historical Interaction Location Map | 4 |
| Power Map | 2 |
| Acoustic Map | 1 |
| Docking Station Map | 5 |
| Field of View | 7 |
| Distance of current location to candidate location | 1/Distance |
| Distance of candidate location to longest wall | 5/Distance |
| Exclusion Map | -10 |
| Ambient Light Map | 1 |
| Personality Map | 2 |
| Current charge level of battery | 10 |

FIG. 6

DYNAMIC WAIT LOCATION FOR AN AUTONOMOUS MOBILE DEVICE

BACKGROUND

Every day a user faces a variety of tasks both personal and work related that need to be attended to. These may include helping in the care of others such as children or the elderly, taking care of a home, staying in contact with others, and so forth. Devices that assist in these tasks may help the user perform the tasks better, may free up the user to do other things, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 6 illustrates parameters and weights that may be applied to these parameters to determine the score for the candidate location, according to some implementations.

Figure 1:
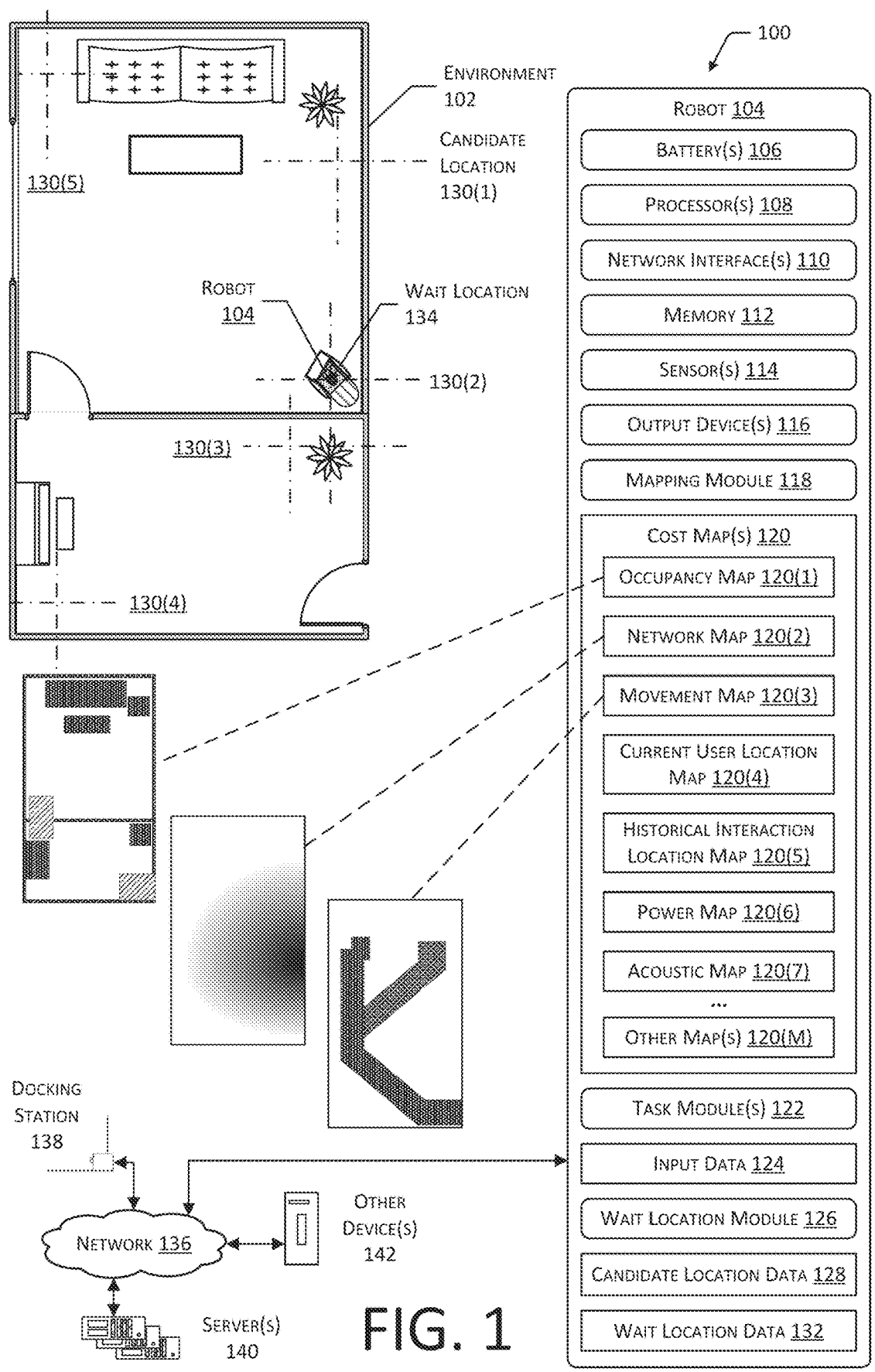
FIG. 1 illustrates a system that includes a robot which is dynamically positioned at a wait location when idle, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

During operation, an autonomous mobile device such as a robotic assistant (robot) may perform various tasks. The robot is capable of autonomous movement, allowing it to move from one location in the environment to another without being "driven" or remotely controlled by a user or other human. Some of the tasks the robot performs may involve the robot moving about an environment. When the robot is idle or not otherwise engaged in a task, the robot may move to a wait location or "hangout". At the wait location, the robot may orient itself so the sensors onboard the robot have a greatest field of view, or are directed towards an area where users are or are expected to be.

A plurality of candidate locations may be designated throughout the environment. For example, a Sobol set may be used to pseudo randomly designate candidate locations throughout the environment. For example, the candidate locations may be distributed across an occupancy map of the environment.

The occupancy map provides information that is indicative of placement of obstacles in the physical environment. These obstacles may include an object or an aspect of an area that impedes movement of the robot. The occupancy map may indicate the presence of walls, furniture, shag carpet that would snarl the robot's wheels, and so forth by providing obstacle cost values for particular areas. For example, a high obstacle cost value may indicate a wall or piece of furniture that the robot is not able to pass through, while a low obstacle cost value may indicate a smooth flat floor. Candidate locations are distributed such that they are not coexistent with an area having an obstacle cost value above a threshold value. In implementations where a high obstacle cost value indicates presence of an obstacle, the candidate locations may be limited to those areas with obstacle cost values less than a threshold value. For example, candidate locations that are within a wall, couch, or other object or aspect that would prevent the robot from being present at that location may be discarded from further consideration.

Scores are calculated for at least some of the candidate locations. These scores are based on a variety of parameters. These parameters may include one or more cost maps. The cost maps provide a cost value for particular areas within the environment. In some implementations the areas designated by a particular cost map may coincide with an area designated by the occupancy map. For example, if the occupancy map divides the environment into a grid of cells, a cost map may have a grid of cells with boundaries that coincide with those in the occupancy map, so they describe the same area within the environment. In other implementations, the areas designated by the occupancy map, the cost maps, and so forth may differ. The cost maps may be generated based on data obtained by the robot or devices carried by the robot, or by other sensors or devices in the environment.

A cost map provides a cost value for a particular location, area, or volume within the environment. The cost value may be indicative of one or more of availability of a resource used by the robot, current location of users, historical locations of users, historical locations where an interaction with the robot previously occurred, characteristics present in the environment, and so forth.

A network map may provide cost values that are indicative of availability of a wireless network. This may include one or more of received signal strength from an access point, connection speed, connection throughput, connection reliability, latency of data transfer, and so forth. An area with a greater cost value may provide better network performance than an area with a lower cost value. For example, the network map may provide signal strength values for areas within the environment. A signal strength value that is greater than a threshold value may indicate that a wireless network access point is able to be used by the robot. In some situations, the robot may use the wireless network to perform some tasks. For example, the wireless network may be used to establish communication between the robot and a server that provides natural language processing of audio input, videoconferencing services, data retrieval, and so forth.

A movement map may provide cost values that are indicative of where in the environment users have been or have passed through. For example, the movement map may provide information about what areas within the environment are heavily trafficked, such as the route through a room from one door to another.

A current user location map provides cost values that are indicative of where in the environment the users currently are. For example, the user location map may indicate the areas in the environment that are occupied by users who are standing, sitting, walking, and so forth.

A historical interaction location map provides cost values that are indicative of where in the environment users have previously interacted with the robot. In some implementations, the historical interaction location map may provide cost values indicative of where the users have previously interacted with other devices. These interactions may include, but are not limited to, a location of one or more of a user or a robot when the user issued a command, provided input to an input device, and so forth.

A power map may provide cost values that are indicative of where in the environment electrical power is available to the robot. For example, the power map may include the location of a charging station, electrical outlet, or other device that allows the robot to acquire energy for further operation.

Other cost maps may be generated that are indicative of conditions within the environment. For example, an acoustic map may provide information about sound levels measured in different areas, a temperature map may provide information about temperatures in different areas, an ambient light level map may provide information about how bright different areas are, and so forth.

In some implementations, a personality map may also be used. The personality map may associate particular areas as being preferred. The personality map may be used to produce the robot behaviors that are predictable but may not be associated with a functional requirement. For example, the personality map may assign higher cost values to areas in front of a window than areas that are away from the window, even though there is not a task associated with the window. In other implementations, instead of or in addition to a personality map, the weighting of various factors may be varied to produce particular behaviors in the robot.

An exclusion map may provide cost values that are indicative of where in the environment the robot is prohibited from travelling. For example, the exclusion map may designate the bathroom is a prohibited area and the robot is not permitted to enter.

As mentioned above, the scores may be based on a variety of parameters. The parameters may include distances between various points. In some implementations, a candidate score of a candidate location may be based at least in part on a distance. For example, at least a portion of the candidate score of a particular candidate location may be inversely proportionate to a distance from a current location of the robot to that candidate location. Continuing the example, candidate locations that are farther away may have lower scores. In another example, the candidate score of the candidate location may be based at least in part on a distance from the candidate location to a longest wall in the room, an electrical outlet, docking station, current location of a user, and so forth. For example, a value of one factor in the candidate score for a candidate location that is closer to a current location of a user may be greater than a value of that factor in another candidate location that is farther from the user.

The parameters may also include data such as a field of view (FOV) that is afforded by a particular candidate location. For example, a first candidate location that provides the robot with a view of almost the entire room may have a greater candidate score than a second candidate location that is in a corner and behind a piece of furniture. The FOV for a particular point may be assessed using one or more techniques. For example, the occupancy map may be used, and distances may be determined along lines that extend from the candidate location at particular angular intervals, such as every 20 degrees, to an obstacle, such as a wall or piece of furniture. A FOV score may be calculated by summing the length of the distances for a particular candidate location. In another example, the occupancy map may be used, and an observable area may be calculated. The observable area may comprise a sum of the portions of the environment, with respect to the candidate location, that are unobstructed.

The parameters may include data about a current charge level of one or more batteries of the robot. For example, if a battery charge level is below a threshold value, a highest weight may be assigned to a candidate location that provides the robot with the ability to recharge. Continuing the example, if the threshold value is 15% and the battery charge level of the robot is currently at 12%, the candidate location that includes a charging station may have a higher candidate score. In other implementations, the parameters may include an expected or projected power consumption. For example, if one or more scheduled tasks are determined to use more power than is available as indicated by the battery charge level, candidate locations that provide an ability to recharge may have a higher score.

The robot may be determined to be idle when no task is currently pending for execution within a threshold value of time from a current time. For example, the robot may be determined to be idle when the next task is a task scheduled for two hours from now, and the threshold value of time is five minutes. In some implementations, the determination as to whether the robot is idle may be based at least in part on the battery charge level being greater than the threshold value. For example, if the battery charge level is below the threshold value, the robot may initiate a task to recharge.

When the robot is determined to be idle, one of the candidate locations is selected as a wait location based at least in part on the candidate score. For example, a highest scoring candidate location may be selected as the wait location. Once selected, the robot may then be moved to that wait location. If the wait location is occupied or unavailable, the robot may proceed to the next highest scoring candidate location.

The candidate score for a particular candidate location may comprise a sum of the cost values for one or more of the cost maps, parameter values, and so forth. In some implementations a weighted sum may be used. For example, each parameter may be multiplied by a weight to produce a value that is then summed. The weight may be used to provide for a relative importance of the particular parameter.

For example, the cost values of the network map may be given greater importance than the cost values from an acoustic map.

The robot may be positioned at the wait location in a particular orientation. In one implementation, the orientation of the robot may be determined such that a FOV of one or more sensors on the robot includes a largest area, an area in which one or more users are currently present, an area in which one or more users have previously been, and so forth. The orientation may be calculated based at least in part using the occupancy map. For example, given a known angular value indicative of a FOV of a camera on the robot and an orientation of that camera with respect to a centerline of a chassis of the robot, the orientation may be determined that encompasses a largest portion of the room.

While at the wait location, the robot may enter a reduced power mode. For example, one or more sensors may be turned off or operated at a lower frequency. The robot may then wait until it receives a command to perform a task, or until a time associated with performance of a particular task has been reached. The robot may then perform that task, which may include moving from the wait location.

In some implementations the robot may be moved from one wait location to another. For example, during mornings the robot may move to a first wait location in the kitchen. Later in the day, even if not otherwise tasked and if the robot is still idle, it may move to a second wait location near the front door to await the arrival of a user.

By using the techniques and systems described in this disclosure, the robot is able to be positioned within the environment such that it is available for use but unobtrusive. Use of the wait locations improves the ability of the robot to safely and effectively operate around and with users by keeping the robot out of the way while still being accessible for use.

Illustrative System

FIG. 1 illustrates a system 100 in which an environment 102 includes a robot 104 that is to dynamically positioned at a wait location when idle, according to some implementations. The robot 104 may include a battery(s) 106 to provide electrical power for operation of the robot 104. The battery 106 may be rechargeable, allowing it to store electrical energy obtained from an external source. In other implementations a wireless power receiver may be used to provide power for operation of the robot 104, recharge the battery 106, and so forth. The robot 104 may include a hardware processor(s) 108 (processors), a network interface(s) 110, a memory(s) 112, sensors 114, and output devices 116. These devices are discussed in more detail with regard to FIGS. 2 and 3.

A mapping module 118 may be stored in the memory 112. The mapping module 118 is used to generate one or more cost maps 120. A cost map 120 provides a cost value for a particular location, area, or volume within the environment 102. The cost value may be indicative of one or more of availability of a resource used by the robot 104, current location of users, historical locations of users, historical locations where an interaction with the robot 104 previously occurred, characteristics present of the environment, and so forth. While the cost maps 120 are depicted as grids with cells defining particular areas, in other implementations the cost maps 120 may be represented in other ways. For example, the cost map 120 may comprise a list, table, set of coordinates, and so forth. The mapping module 118 may use data from the sensors 114 or other devices to determine one or more of the cost maps 120.

The cost maps 120 may include an occupancy map 120(1) or other representation of the physical environment 102. For example, one or more cameras may obtain image data of the environment 102. The image data may be processed to determine the presence of obstacles. The occupancy map 120(1) may comprise data that indicates the location of one or more obstacles, such as a table, wall, and so forth. In some implementations, the occupancy map 120(1) may comprise a plurality of cells with each cell of the plurality of cells representing a particular area in the physical environment 102 and having an obstacle cost value that is indicative of whether the cell contains an obstacle. An obstacle may comprise an object or feature that prevents or impairs traversal by the robot 104. For example, an obstacle may comprise a wall, stairwell, and so forth.

A network map 120(2) may provide cost values that are indicative of availability of a wireless network. This may include one or more of received signal strength from an access point, connection speed, connection throughput, connection reliability, latency of data transfer, and so forth. An area with a greater cost value may provide better network performance than an area with a lower cost value. For example, the network map 120(2) may provide signal strength values for areas within the environment 102 as received by a receiver of the network interface 110. In one implementation, the cost value of the network map 120(2) may be based on a received signal strength indication (RSSI) as generated by a WiFi radio. A signal strength value that is greater than a threshold value may indicate that a wireless network access point is able to be used by the robot 104. In some situations, the robot 104 may use the wireless network to perform some tasks. For example, the wireless network may be used to establish communication between the robot 104 and a server that provides natural language processing of audio input, videoconferencing services, data retrieval, and so forth. In some implementations data from other devices in the environment 102 may be used to generate the cost values in the network map 120(2). For example, if an internet enabled audio device, set top box (STB) and so forth are in the environment 102 and have radios, they may provide data that is used to generate the cost values for the network map 120(2).

A movement map 120(3) may provide cost values that are indicative of where others in the environment 102 have been, or have passed through. The movement map 120(3) may indicate a location of a person, other robot, pet, and so forth that was in motion. For example, the movement map 120(3) may provide information about areas within the environment 102 at which one or more users have been detected in motion at one or more times. Continuing the example, the movement map 120(3) may include areas such as a route through a room from one door to another and omit areas at which users are at rest, such as chairs and beds.

The mapping module 118 may use data from the sensors 114 on the robot 104 or other sensors in the environment 102 to determine user location data indicative of a user location in the environment 102. The user location data may be indicative of coordinates within the environment 102 that are indicative of a point associated with the user. For example, the user location data may indicate a centroid of the area occupied by the user with respect to a fixed coordinate system used to represent locations within the environment 102.

A current user location map 120(4) provides cost values that are indicative of where in the environment 102 users currently are. For example, the current user location map

120(4) may indicate the areas in the environment 102 that are occupied by users who are standing, sitting, walking, and so forth.

A historical interaction location map 120(5) provides cost values that are indicative of where in the environment 102 others have previously interacted with the robot 104. In some implementations, the historical interaction location map 120(5) may provide cost values indicative of where the users, robots, pets, and so forth have previously interacted with other devices. These interactions may include, but are not limited to, a location of one or more of a user or a robot 104 when the user issued a command, provided input to an input device, and so forth. For example, the historical interaction location map 120(5) may indicate that the robot 104 frequently experiences an interaction at a spot near the front door.

A power map 120(6) may provide cost values that are indicative of where in the environment 102 electrical power is available to the robot 104. For example, the power map 120(6) may include the location of a charging station, electrical outlet, wireless charging location, or other device that allows the robot 104 to acquire energy for further operation. For example, if the robot 104 is able to plug itself into an alternating current outlet, the power map 120(6) may indicate electrical outlets.

An acoustic map 120(7) may provide information about sound levels measured at different areas in the environment 102. If the robot 104 accepts audible input, such as the user speaking a command, it is advantageous for the robot 104 to wait in locations that are quiet enough that the command can be detected and processed properly. For example, if the robot 104 is waiting in a very noisy area, it may not be able to hear a spoken command, or the spoken command may be so garbled with noise that it is unintelligible by the robot 104 or another system. The acoustic map 120(7) may be indicative of noise levels measured currently, at previous times, or a combination thereof. For example, the acoustic map 120 (7) may be generated by the robot 104 sampling noise levels using a microphone while the robot 104 is in the environment 102.

In some implementations, a personality map may also be used. The personality map may associate particular areas as being preferred or discouraged. The personality map may be used to produce in the robot 104 behaviors that are predictable but may not be associated with a functional requirement. For example, the personality map may assign higher cost values to areas in front of a window than areas that are away from the window, even though there is not a task associated with the window. As a result, the robot 104 may then tend to wait at locations near the window. In other implementations, instead of or in addition to a personality map, the weighting of various factors may be varied to produce particular behaviors in the robot 104. For example, the weight of the ambient light level map may be increased to encourage the use of wait locations that are in a brightly lit area, such as near the window.

Other cost maps 120(M) may be generated. An exclusion map may provide cost values that are indicative of where in the environment 102 the robot 104 is prohibited from travelling. For example, the exclusion map may designate the bathroom as a prohibited area and the robot 104 is not permitted to enter. In another example, a temperature map may provide information about ambient temperatures in different areas. In yet another example, an ambient light level map may provide information about how bright different areas are.

One or more task modules 122 may be stored in the memory 112. The task modules 122 may comprise instructions that, when executed by the processor 108 perform a task. For example, a video call module may be used to have the robot 104 find a particular user and present a video call using the output devices 116. In another example, a sentry task module 122 may be used to have the robot 104 travel throughout the home, avoid users, and generate a report as to the presence of an unauthorized person.

During operation the robot 104 may determine input data 124. The input data 124 may include sensor data from the sensors 114 onboard the robot 104. For example, the input data 124 may comprise a verbal command provided by the user and detected by a microphone on the robot 104.

In some situations, the task performed by the robot 104 may include moving the robot 104 within the environment 102. These tasks may involve various behaviors by the robot 104. These behaviors may include an approach behavior, a follow behavior, an avoid behavior, and so forth. For example, the robot 104 may be directed to perform a task that includes presenting a video call on a display output device 116 to a first user. This task may include an avoidance behavior causing the robot 104 to avoid another user while seeking out the first user. When found, the robot 104 uses an approach behavior to move near the first user.

A wait location module 126 uses candidate location data 128 about candidate locations 130 to determine wait location data 132 indicative of a wait location 134. In some implementations the wait location module 126 or another module may determine if the robot 104 is idle. In some implementations, the robot 104 may be deemed to be idle if not otherwise tasked during a period of time. For example, if the robot 104 does not begin a task within five minutes, it may be deemed idle and may move to a wait location 134. In other implementations the robot 104 may be determined to be idle when no task is currently pending for execution within a threshold value of time from a current time. For example, the robot 104 may be determined to be idle when the task module 122 has a next task scheduled for two hours from now, and the threshold value of time is five minutes. In some implementations, the determination as to whether the robot 104 is idle may be based at least in part on a battery charge level of the robot 104 and a threshold value. For example, if the battery charge level is below the threshold value, the robot 104 may initiate a task to recharge.

When the robot 104 is determined to be idle, or the robot 104 has received a command to wait, one of the candidate locations 130 is selected as a wait location 134 based at least in part on a candidate score of the candidate location 130. In some implementations the candidate location data 128 may be determined, at least in part, in advance. For example, at least a portion of the candidate score for the candidate locations 130(1)-(L) may be pre-calculated in advance.

A device, such as a server or the robot 104, may designate candidate locations 130(1), 130(2), . . . , 130(L) throughout the environment 102 at points indicated by the occupancy map 120(1) as having an obstacle cost value below a threshold. For example, a Sobol function may be used to pseudo randomly distribute candidate locations 130 throughout the environment 102. Those locations that are deemed within an obstacle, such as being coexistent with an area with an obstacle cost value that is greater than a threshold, may be removed from further consideration. In other implementations other functions may be used. For example, the candidate locations 130 may be distributed in a grid pattern throughout the environment 102 to locations that are not coexistent with an obstacle as indicated by the occupancy map 120(1).

The wait location module 126 may then determine the candidate score for one or more of the candidate locations 130. In one implementation the candidate score may comprise a sum of cost values of one or more of the cost maps 120. For example, the candidate score may comprise a weighted sum of the network map 120(2) cost values, the movement map 120(3) cost values, and so forth for the area that includes the candidate location 130(1).

The wait location module 126 may determine the candidate score based at least in part on one or more parameters. The parameters may include distances between various points. In some implementations, the candidate score of a candidate location 130 may be based at least in part on a distance. For example, at least a portion of the candidate score of a particular candidate location 130 may be inversely proportionate to a distance from a current location of the robot 104 to that candidate location 130. Continuing the example, candidate locations 130 that are farther away may have lower scores. In another example, the candidate score of the candidate location 130 may be based at least in part on a distance from the candidate location 130 to a longest wall in the room, an electrical outlet, docking station, current location of a user, and so forth. For example, a value of one factor in the candidate score for a candidate location 130 that is closer to a current location of a user may be greater than a value of that factor in another candidate location that is farther from the user.

The parameters may also include data such as a field of view (FOV) that is afforded by a particular candidate location 130. For example, the candidate location 130(2) that provides the robot 104 with a view of almost the entire room may have a greater candidate score than the candidate location 130(5) that is in a corner and obscured by a piece of furniture. The FOV for a particular candidate location 130 may be assessed using one or more techniques. For example, the occupancy map 120(1) may be used, and distances may be determined for lines that extend from the candidate location 130 at particular angular intervals, such as every 20 degrees, to an obstacle, such as a wall or piece of furniture. A FOV score may be calculated by summing the distances for a particular candidate location 130. In another example, the occupancy map 120(1) may be used, and an observable area may be calculated. The observable area may comprise a sum of the portions of the environment 102, with respect to the candidate location 130, that are unobstructed. The determination of the FOV and observable area is discussed in more detail with regard to FIG. 4.

The parameters may include data about a current charge level of one or more batteries 106 of the robot 104. For example, if a battery charge level is below a threshold value, a highest weight may be assigned to a candidate location 130 that provides the robot 104 with the ability to recharge. Continuing the example, if the threshold value is 15% and the battery charge level of the robot is currently at 12%, the candidate location 130 that includes a charging station may have a higher candidate score. In other implementations, the parameters may include an expected or projected power consumption. For example, if one or more scheduled tasks are determined to use more power than is available as indicated by the battery charge level, candidate locations 130 that provide an ability to recharge may have a higher score.

The candidate score for a particular candidate location 130 may comprise a sum of the cost values for one or more of the cost maps 120, parameter values, and so forth. In some implementations a weighted sum may be used. For example, each parameter may be multiplied by a weight to produce a value that is then summed. The weight may be used to provide for a relative importance of the particular parameter. For example, the cost values of the network map 120(2) may be given greater importance than the cost values from an acoustic map 120 (7).

When the wait location module 126 determines that the robot 104 is idle, or has received a command to proceed to a wait location 134, the wait location module 126 determines the wait location data 132. The candidate scores may be calculated, and the candidate location 130(1) having the greatest score may be determined to be the wait location 134 for use. As described above, the candidate score may be based at least in part on a current location of the robot 104, battery charge level of the robot 104, or other factors.

The wait location data 132 specifies the candidate location 130 and an orientation for the robot 104 to assume at that candidate location 130. The robot 104 may be positioned at the wait location 134 in a particular orientation. In one implementation, the orientation of the robot 104 may be determined such that a FOV of one or more sensors 114 on the robot 104 includes a largest area, an area in which one or more users are currently present, an area in which one or more users have previously been, and so forth. The orientation may be calculated based at least in part using the occupancy map 120(1). For example, given a known angular value indicative of a FOV of a camera on the robot 104 and an orientation of that camera with respect to a centerline of a chassis of the robot 104, the orientation may be determined that encompasses one or more of a greatest distance to an obstacle in the room, a largest area of the room, or a largest volume of the room.

For example, the wait location data 132 may indicate the coordinates within the environment 102 of the candidate location 130(2), and the orientation that provides the robot's 104 sensors 114 with a view of a greatest area of the room. Continuing the example, the wait location data 132 may place the robot 104 at the candidate location 130(2) in the corner, with the robot 104 oriented so that one or more onboard sensors 114, such as a camera, are directed towards the center of the room.

Once determined, the robot 104 may then be moved to that wait location 134. If the wait location 134 is occupied or otherwise unavailable, the robot 104 may proceed to the candidate location 130 with the next highest candidate score. For example, the robot 104 may arrive at the wait location 134 and determine using onboard microphones that an acoustic sound level at the wait location 134 location exceeds a threshold value. If the sound level is too great, such as in a noisy spot, the robot 104 may be unable to detect or properly respond to audible commands, such as spoken by the user. As a result, the robot 104 may move to the candidate location 130 with the next highest candidate score.

While at the wait location 134, the robot 104 may enter a reduced power mode. For example, one or more sensors 114 may be turned off or operated at a lower frequency. The robot 104 may then wait until it receives a command to perform a task, or until a time associated with performance of a particular task has been reached. The robot 104 may then perform that task, which may include moving from the wait location 134.

In some implementations the robot 104 may be moved from one wait location 134 to another. For example, during mornings the robot 104 may move to a first wait location 134 in the kitchen. Later in the day, even if not otherwise tasked and if the robot is still idle, it may move to a second wait location 134 near the front door to await the arrival of a user.

By using the techniques and systems described in this disclosure, the robot is able to be positioned within the environment 102 such that it is available for use but unobtrusive. Use of the wait locations 134 improves the ability of the robot 104 to safely and effectively operate around and with users by keeping the robot 104 out of the way while still being accessible for use.

The robot 104 may use the network interfaces 110 to connect to a network 136. For example, the network 136 may comprise a wireless local area network, that in turn is connected to a wide area network such as the Internet.

The robot 104 may be configured to dock or connect to a docking station 138. The docking station 138 may also be connected to the network 136. For example, the docking station 138 may be configured to connect to the wireless local area network such that the docking station 138 and the robot 104 may communicate. The docking station 138 may provide external power which the robot 104 may use to charge the battery 106.

The robot 104 may access one or more servers 140 via the network 136. For example, the robot 104 may utilize a wake word detection module to determine if the user is addressing a request to the robot 104. The wake word detection module may hear a specified word or phrase and transition the robot 104 or portion thereof to the wake operating mode. Once in the wake mode, the robot 104 may then transfer at least a portion of the audio spoken by the user to one or more servers 140 for further processing. The servers 140 may process the spoken audio and return to the robot 104 data that may be subsequently used to operate the robot 104.

The robot 104 may also communicate with other devices 142. The other devices 142 may include home automation controls, sensors, and so forth that are within the home or associated with operation of one or more devices in the home. For example, the other devices 142 may include a doorbell camera, a garage door, a refrigerator, washing machine, a network connected microphone, and so forth. In some implementations the other devices 142 may include other robots 104, vehicles, and so forth.

In other implementations, other types of autonomous mobile devices (AMD) may use the systems and techniques described herein. For example, the AMD may comprise an autonomous ground vehicle that is moving on a street, an autonomous aerial vehicle in the air, autonomous marine vehicle, and so forth.

Figure 2:
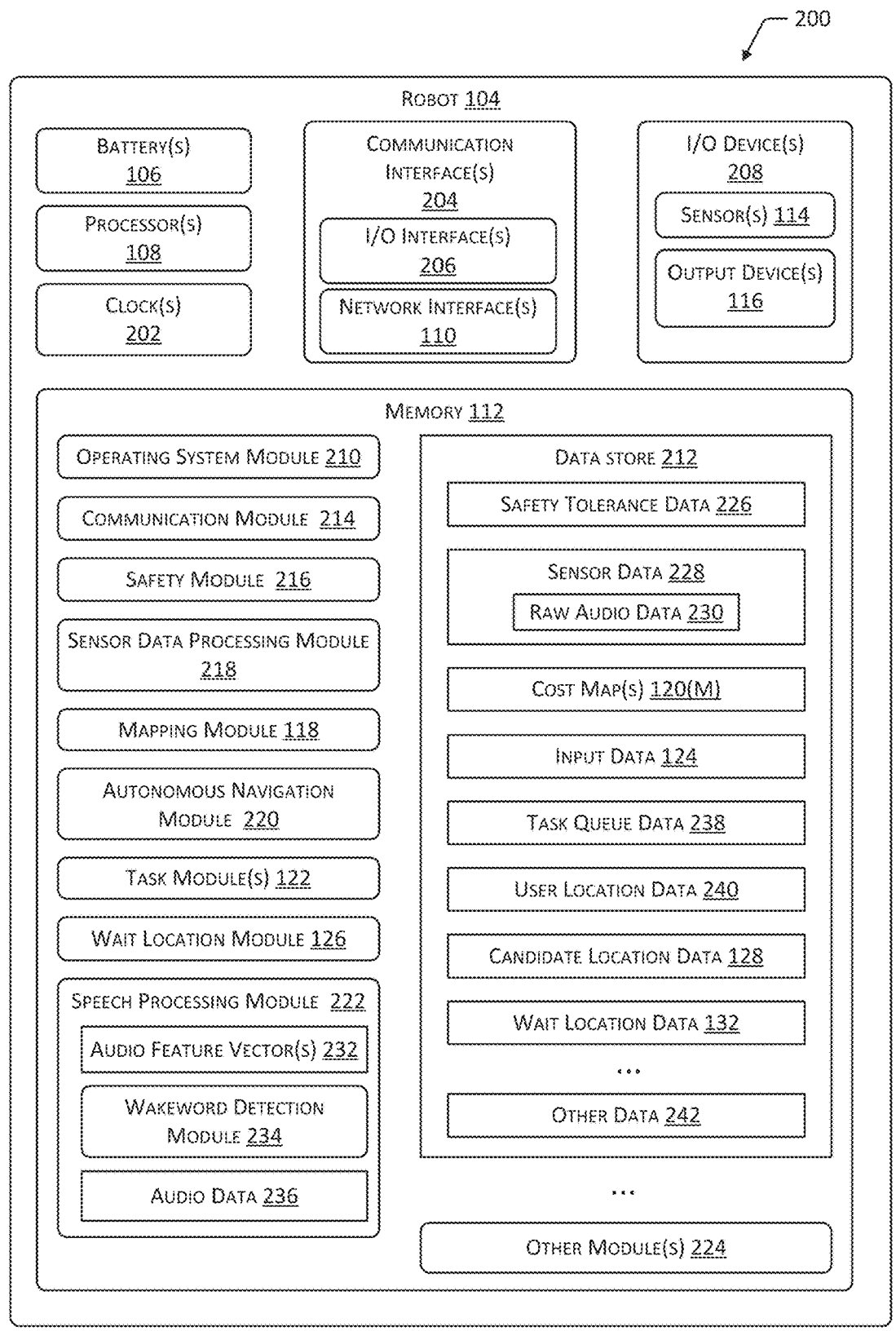
FIG. 2 is a block diagram of the components of the robot, according to some implementations.

FIG. 2 is a block diagram 200 of the robot 104, according to some implementations. The robot 104 may include one or more batteries 106 to provide electrical power suitable for operating the components in the robot 104. In some implementations other devices 142 may be used to provide electrical power to the robot 104. For example, power may be provided by wireless power transfer, capacitors, fuel cells, storage flywheels, and so forth.

The robot 104 may include one or more hardware processors 108 (processors) configured to execute one or more stored instructions. The processors 108 may comprise one or more cores. The processors 108 may include microcontrollers, systems on a chip, field programmable gate arrays, digital signals processors, graphic processing units, general processing units, and so forth. One or more clocks 202 may provide information indicative of date, time, ticks, and so forth. For example, the processor 108 may use data from the clock 202 to associate a particular interaction with a particular point in time.

The robot 104 may include one or more communication interfaces 204 such as input/output (I/O) interfaces 206, network interfaces 110, and so forth. The communication interfaces 204 enable the robot 104, or components thereof, to communicate with other devices 142 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 208. The I/O devices 208 may include input devices such as one or more of a sensor 114, keyboard, mouse, scanner, and so forth. The I/O devices 208 may also include output devices 116 such as one or more of a motor, light, speaker, display, projector, printer, and so forth. In some embodiments, the I/O devices 208 may be physically incorporated with the robot 104 or may be externally placed.

The network interfaces 110 may be configured to provide communications between the robot 104 and other devices 142 such as other robots 104, a docking station 138, routers, access points, and so forth. The network interfaces 110 may include devices configured to couple to personal area networks (PANs), local area networks (LANs), wireless local area networks (WLANS), wide area networks (WANs), and so forth. For example, the network interfaces 110 may include devices compatible with Ethernet, Wi-Fi, Bluetooth, Bluetooth Low Energy, ZigBee, and so forth.

The robot 104 may also include one or more busses or other internal communications hardware or software that allow for the transfer of data between the various modules and components of the robot 104.

As shown in FIG. 2, the robot 104 includes one or more memories 112. The memory 112 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 112 provides storage of computer-readable instructions, data structures, program modules, and other data for the operation of the robot 104. A few example functional modules are shown stored in the memory 112, although the same functionality may alternatively be implemented in hardware, firmware, or as a system on a chip (SoC).

The memory 112 may include at least one operating system (OS) module 210. The OS module 210 is configured to manage hardware resource devices such as the I/O interfaces 206, the I/O devices 208, the communication interfaces 204, and provide various services to applications or modules executing on the processors 108. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the Robot Operating System (ROS) as promulgated at www.ros.org, and so forth.

Also stored in the memory 112 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 142 including other robots 104, servers, network attached storage devices, and so forth.

A communication module 214 may be configured to establish communication with other devices 142, such as other robots 104, an external server 140, a docking station 138, and so forth. The communications may be authenticated, encrypted, and so forth.

Other modules within the memory 112 may include a safety module 216, a sensor data processing module 218, the mapping module 118, an autonomous navigation module 220, the one or more task modules 122, the wait location module 126, a speech processing module 222, or other modules 224. The modules may access data stored within the data store 212, such as safety tolerance data 226, sensor data 228, the cost maps 120, the input data 124, task queue data 238, user location data 240, candidate location data 128, or other data 242.

The safety module 216 may access safety tolerance data 226 to determine within what tolerances the robot 104 may operate safely within the physical environment 102. For example, the safety module 216 may be configured to stop the robot 104 from moving when the extensible mast is extended. In another example, the safety tolerance data 226 may specify a minimum sound threshold which, when exceeded, stops all movement of the robot 104. Continuing this example, detection of sound such as a human yell would stop the robot 104. In another example, the safety module 216 may access safety tolerance data 226 that specifies a minimum distance from an object that the robot 104 may maintain. Continuing this example, when a sensor 114 detects an object has approached to less than the minimum distance, all movement of the robot 104 may be stopped. Movement of the robot 104 may be stopped by one or more of inhibiting operations of one or more of the motors, issuing a command to stop motor operation, disconnecting power from one or more the motors, and so forth. The safety module 216 may be implemented as hardware, software, or a combination thereof.

The safety module 216 may control other factors, such as a maximum speed of the robot 104 based on information obtained by the sensors 114, precision and accuracy of the sensor data 228, and so forth. For example, detection of an object by an optical sensor may include some error, such as when the distance to an object comprises a weighted average between an object and a background. As a result, the maximum speed permitted by the safety module 216 may be based on one or more factors such as the weight of the robot 104, nature of the floor, distance to object, and so forth. In the event that the maximum permissible speed differs from the maximum speed permitted by the safety module 216, the lesser speed may be utilized.

The sensor data processing module 218 may access sensor data 228 that is acquired from one or more the sensors 114. The sensor data processing module 218 may provide various processing functions such as de-noising, filtering, change detection, and so forth. Processing of sensor data 228, such as images from a camera sensor, may be performed by a module implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 228. In still another implementation, functions such as those in the Machine Vision Toolbox (MVTB) available using MATLAB as developed by Math Works, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 228 or other data 242. For example, the ANN may be a trained using a supervised learning algorithm such that object identifiers are associated with images of particular objects within training images provided to the ANN. Once trained, the ANN may be provided with the sensor data 228 and produce output indicative of the object identifier.

The sensor data processing module 218 may use data from the sensors 114 on the robot 104 or other sensors 114 in the environment 102 to determine the user location data 240 indicative of a user location in the environment 102. The user location data 240 may be indicative of coordinates within the environment 102 that are indicative of a point associated with the user. For example, the user location data 240 may indicate a centroid of the area occupied by the user with respect to a fixed coordinate system used to represent locations within the environment 102.

The mapping module 118 may operate as described above to generate the occupancy map 120(1), or other cost maps 120(M).

The autonomous navigation module 220 provides the robot 104 with the ability to navigate within the physical environment 102 without real-time human interaction. The autonomous navigation module 220 may implement, or operate in conjunction with, the mapping module 118 to determine the occupancy map 120(1) or other representation of the physical environment 102. In one implementation, the mapping module 118 may use one or more simultaneous localization and mapping ("SLAM") techniques. The SLAM algorithms may utilize one or more of maps, algorithms, beacons, or other techniques to provide navigational data. The navigational data may then be used to determine the path plan data which is then subsequently used to determine a set of commands that drive the motors connected to the wheels. For example, the autonomous navigation module 220 may determine a location with the environment 102, estimate a path to a destination, and so forth.

The robot 104 autonomous navigation module 220 may generate path plan data that is indicative of a path through the environment from a current location to a destination. The autonomous navigation module 220 may use data indicative of a current location and accept the wait location data 132 as a destination, and then determine the path plan data that describes path to the wait location 134.

The autonomous navigation module 220 may include an obstacle avoidance module. For example, if an obstacle is detected along a planned path, the obstacle avoidance module may re-route the robot 104 to move around the obstacle or take an alternate path.

The autonomous navigation module 220 may utilize various techniques during processing of sensor data 228. For example, image data obtained from cameras on the robot 104 may be processed to determine one or more of corners, edges, planes, and so forth. In some implementations corners may be detected and the coordinates of those corners may be used to produce point cloud data.

The occupancy map 120(1) or other cost maps 120(M) may be manually or automatically determined. Continuing the example, during a learning phase the user may take the robot 104 on a tour of the environment 102, allowing the robot 104 to generate the occupancy map 120(1) and associated data, such as tags designating a particular room, such as "kitchen" or "bedroom". In another example, during subsequent operation the robot 104 may generate the occupancy map 120(1) that is indicative of locations of obstacles such as chairs, doors, stairwells, and so forth as it moves unattended through the environment 102.

In some implementations, the occupancy map 120(1) may include floor characterization data. The floor characterization data is indicative of one or more attributes of the floor at a particular location within the physical environment 102. During operation of the robot 104, floor characterization data may be obtained. The floor characterization data may be utilized by one or more of the safety module 216, the autonomous navigation module 220, the task module 122, or other modules 224. For example, the floor characterization data may be used to determine if an unsafe condition occurs such as a wet floor. In another example, the floor characterization data may be used by the autonomous navigation module 220 to assist in the determination of the current location of the robot 104 within the home. For example, if the autonomous navigation module 220 determines that the robot 104 is located in the dining room, but the floor characterization data indicates that the floor is consistent with the living room, an error condition may be generated in which other techniques are used to determine the location of the robot 104 or otherwise resolve the difference. For example, the robot 104 may attempt to return to the docking station 138 and then, using information about the path traveled, determine the previously ambiguous location within the home.

The floor characterization data may include one or more of a location designator, floor type, floor texture, coefficient of friction, surface resistivity, color, and so forth. The location designator may be specified based on input from the user. For example, the robot 104 may use speech synthesis to ask the user "what room is this?" during a training phase. The utterance of the user may be received by the microphone array and the audio data "this is the living room" may be processed and subsequently used to generate the location designator.

The autonomous navigation module 220 may be used to move the robot 104 from a first location to a second location within the physical environment 102. This movement may be responsive to a determination made by an onboard processor 108, in response to a command received via one or more communication interfaces 204 or a sensor 114, and so forth. For example, an external server 140 may send a command that is subsequently received using a network interface 110. This command may direct the robot 104 to proceed to a designated destination, such as "living room" or "dining room". The robot 104 may then process this command, and use the autonomous navigation module 220 to determine the directions and distances associated with reaching the specified destination.

The memory 112 may store one or more task modules 122. The task module 122 comprises instructions that, when executed, provide one or more functions associated with a particular task. In one example, the task may comprise a security or sentry task in which the robot 104 travels throughout the physical environment 102 avoiding users and looking for events that exceed predetermined thresholds. In another example, the task may comprise a "follow me" feature in which the robot 104 follows a user using a follow behavior.

In some implementations, the wait location module 126 may determine that the robot 104 is idle based on the task queue data 238. Tasks that are to be performed may be enqueued in the task queue data 238. The task module 122 may then read the queue and process the enqueued tasks. If the task queue data 238 is empty, or the next enqueued task is not scheduled for execution for a period of time that is greater than a threshold value from the current time, the wait location module 126 may determine the robot 104 is idle.

The speech processing module 222 may be used to process utterances of the user. Microphones may acquire audio in the presence of the robot 104 and may send raw audio data 230 to an acoustic front end (AFE). The AFE may transform the raw audio data 230 (for example, a single-channel, 16-bit audio stream sampled at 16 kHz), captured by the microphone, into audio feature vectors 232 that may ultimately be used for processing by various components, such as a wakeword detection module 234, speech recognition engine, or other components. The AFE may reduce noise in the raw audio data 230. The AFE may also perform acoustic echo cancellation (AEC) or other operations to account for output audio data that may be sent to a speaker of the robot 104 for output. For example, the robot 104 may be playing music or other audio that is being received from a network 136 in the form of output audio data. To prevent the output audio from interfering with the device's ability to detect and process input audio, the AFE or other component may perform echo cancellation to remove the output audio data from the input raw audio data 230, or other operations.

The AFE may divide the audio data into frames representing time intervals for which the AFE determines a number of values (i.e., features) representing qualities of the raw audio data 230, along with a set of those values (i.e., a feature vector or audio feature vector 232) representing features/qualities of the raw audio data 230 within each frame. A frame may be a certain period of time, for example a sliding window of 25 ms of audio data 236 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 230, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 232 (or the raw audio data 230) may be input into a wakeword detection module 234 that is configured to detect keywords spoken in the audio. The wakeword detection module 234 may use various techniques to determine whether audio data 236 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the robot 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the robot 104 (or separately from speech detection), the robot 104 may use the wakeword detection module 234 to perform wakeword detection to determine when a user intends to speak a command to the robot 104. This process may also be referred to as keyword detection, with the wakeword being a specific example of a keyword. Specifically, keyword detection is typically performed without performing linguistic analysis, textual analysis, or semantic analysis. Instead, incoming audio (or audio data 236) is analyzed to determine if specific characteristics of the audio match preconfigured acoustic waveforms, audio signatures, or other data to determine if the incoming audio "matches" stored audio data 236 corresponding to a keyword.

Thus, the wakeword detection module 234 may compare audio data 236 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local robot 104 may "wake" and begin transmitting audio data 236 (which may include one or more audio feature vectors 232 or the raw audio data 230) to one or more server(s) 140 for speech processing. The audio data 236 corresponding to audio obtained by the microphone may be sent to a server 140 for routing to a recipient device or may be sent to the server 140 for speech processing for interpretation of the included speech (either for purposes of enabling voice-communications and/or for purposes of executing a command in the speech). The audio data 236 may include data corresponding to the wakeword, or the portion of the audio data 236 corresponding to the wakeword may be removed by the local robot 104 prior to sending.

The robot 104 may connect to the network 136 using one or more of the network interfaces 110. One or more servers 140 may provide various functions, such as ASR, natural language understanding (NLU), providing content such as audio or video to the robot 104, and so forth.

The other modules 224 may provide other functionality, such as object recognition, speech synthesis, user identification, and so forth. For example, an automated speech recognition (ASR) module may accept as input raw audio data 230 or audio feature vectors 232 and may produce as output a text string that is further processed and used to provide input, a task module 122, and so forth. In one implementation, the text string may be sent via a network 136 to a server 140 for further processing. The robot 104 may receive a response from the server 140 and present output, perform an action, and so forth. For example, the raw audio data 230 may include the user saying "robot go to the dining room". The audio data 236 representative of this utterance may be sent to the server 140 that returns commands directing the robot 104 to the dining room of the home associated with the robot 104.

The utterance may result in a response from the server 140 that directs operation of other devices 142 or services. For example, the user may say "robot wake me at seven tomorrow morning". The audio data 236 may be sent to the server 140 that determines the intent and generates commands to instruct a device attached to the network 136 to play an alarm at 7:00 am the next day.

The other modules 224 may comprise a speech synthesis module that is able to convert text data to human speech. For example, the speech synthesis module may be used by the robot 104 to provide speech that a user is able to understand.

The data store 212 may store other data 242 as well. For example, localization settings may indicate local preferences such as language. User identifier data may be stored that allows for identification of a particular user. In some implementations data, such as the user location data 240, cost maps 120 such as the historical interaction location map 120(5) and so forth may be associated with or indicative of the particular user identifier. For example, the historical interaction location map 120(5) may contain data that indicates interactions with respect to particular user identifiers.

Figure 3:
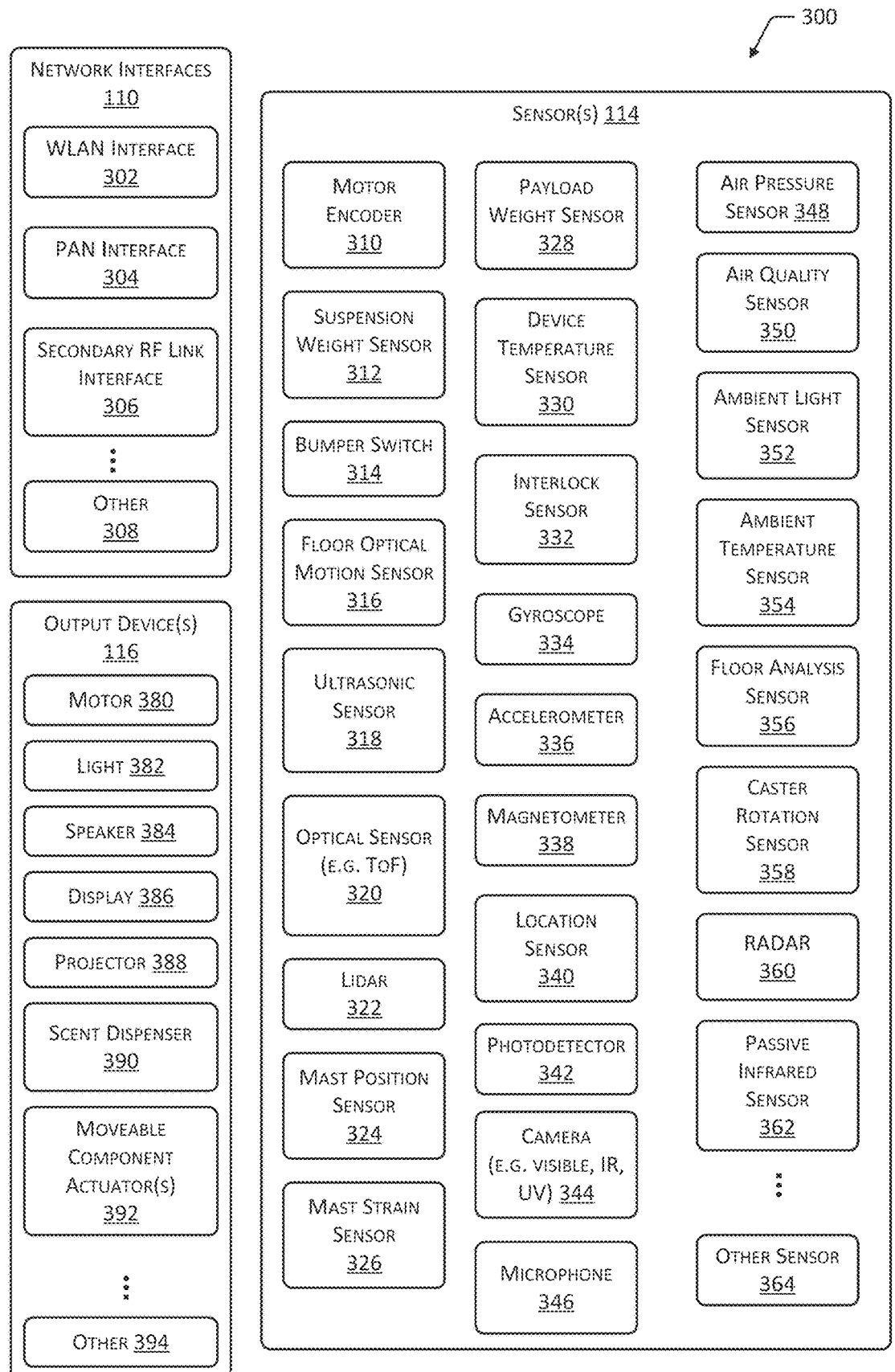
FIG. 3 is a block diagram of some components of the robot such as network interfaces, sensors, and output devices, according to some implementations.

FIG. 3 is a block diagram 300 of some components of the robot 104 such as network interfaces 110, sensors 114, and output devices 116, according to some implementations. The components illustrated here are provided by way of illustration and not necessarily as a limitation. For example, the robot 104 may utilize a subset of the particular network interfaces 110, output devices 116, or sensors 114 depicted here, or may utilize components not pictured. One of more of the sensors 114, output devices 116, or a combination thereof may be included on a moveable component that may be panned, tilted, rotated, or any combination thereof with respect to a chassis of the robot 104.

The network interfaces 110 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with the least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the robot 104 and other devices 142 in the event that communication fails using one or more of the WLAN interface 302 or the PAN interface 304. For example, in the event the robot 104 travels to an area within the physical environment 102 that does not have Wi-Fi coverage, the robot 104 may use the secondary RF link interface 306 to communicate with another device such as a specialized access point, docking station 138, or other robot 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 3G, 4G, LTE, or other standards.

The robot 104 may include one or more of the following sensors 114. The sensors 114 depicted here are provided by way of illustration and not necessarily as a limitation. It is understood that other sensors 114 may be included or utilized by the robot 104, while some sensors 114 may be omitted in some configurations.

A motor encoder 310 provides information indicative of the rotation or linear extension of a motor. The motor may comprise a rotary motor, or a linear actuator. In some implementations, the motor encoder 310 may comprise a separate assembly such as a photodiode and encoder wheel that is affixed to the motor. In other implementations, the motor encoder 310 may comprise circuitry configured to drive the motor. For example, the autonomous navigation module 220 may utilize the data from the motor encoder 310 to estimate a distance traveled.

A suspension weight sensor 312 provides information indicative of the weight of the robot 104 on the suspension system for one or more of the wheels or the caster. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 216 may use data from the suspension weight sensor 312 to determine whether or not to inhibit operation of one or more of the motors. For example, if the suspension weight sensor 312 indicates no weight on the suspension, the implication is that the robot 104 is no longer resting on its wheels, and thus operation of the motors may be inhibited. In another example, if the suspension weight sensor 312 indicates weight that exceeds a threshold value, the implication is that something heavy is resting on the robot 104 and thus operation of the motors may be inhibited.

One or more bumper switches 314 provide an indication of physical contact between a bumper or other member that is in mechanical contact with the bumper switch 314. Safety module 216 may utilize sensor data 228 obtained by the bumper switches 314 to modify the operation of the robot 104. For example, if the bumper switch 314 associated with a front of the robot 104 is triggered, the safety module 216 may drive the robot 104 backwards.

A floor optical motion sensor (FOMS) 316 provides information indicative of motion of the robot 104 relative to the floor or other surface underneath the robot 104. In one implementation, the FOMS 316 may comprise a light source such as light-emitting diode (LED), an array of photodiodes, and so forth. In some implementations, the FOMS 316 may utilize an optoelectronic sensor, such as a low resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data.

An ultrasonic sensor 318 may utilize sounds in excess of 20 kHz to determine a distance from the sensor 114 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 228 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 114 such as an image sensor or camera. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 216 and the autonomous navigation module 220 may utilize the sensor data 228 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight a distance to that particular point, sensor data 228 may be generated that is indicative of the presence of objects and the relative positions, shapes, and so forth is visible to the lidar 322. Data from the lidar 322 may be used by various modules. For example, the autonomous navigation module 220 may utilize point cloud data generated by the lidar 322 for localization of the robot 104 within the physical environment.

The robot 104 may include a mast. A mast position sensor 324 provides information indicative of a position of the mast of the robot 104. For example, the mast position sensor 324 may comprise limit switches associated with the mast extension mechanism that indicate whether the mast is an extended or retracted position. In other implementations, the mast position sensor 324 may comprise an optical code on at least a portion of the mast that is then interrogated by an optical emitter and a photodetector to determine the distance to which the mast is extended. In another implementation, the mast position sensor 324 may comprise an encoder wheel that is attached to a mast motor that is used to raise or lower the mast. The mast position sensor 324 may provide data to the safety module 216. For example, if the robot 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the robot 104. For example, the mast strain sensor 326 may comprise a strain gauge or load cell that measures a side-load applied to the mast, a weight on the mast, or downward pressure on the mast. The safety module 216 may utilize sensor data 228 obtained by the mast strain sensor 326. For example, if the strain applied to the mast exceeds a threshold amount, the safety module 216 may direct an audible and visible alarm to be presented by the robot 104.

The robot 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more device temperature sensors 330 may be utilized by the robot 104. The device temperature sensors 330 provide temperature data of one or more components within the robot 104. For example, a device temperature sensor 330 may indicate a temperature of one or more of the batteries 106, one or more motors, and so forth. In the event the temperature exceeds a threshold value, the component associated with that device temperature sensor 330 may be shut down.

One or more interlock sensors 332 may provide data to the safety module 216 or other circuitry that prevents the robot 104 from operating in an unsafe condition. For example, the interlock sensors 332 may comprise switches that indicate whether an access panel is open. The interlock sensors 332 may be configured to inhibit operation of the robot 104 until the interlock switch indicates a safe condition is present.

A gyroscope 334 may provide information indicative of rotation of an object affixed thereto. For example, gyroscope 334 may generate sensor data 228 that is indicative of a change in orientation of the robot 104 or portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The robot 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provide sensor data 228 indicative of impinging light. For example, the photodetector 342 may provide data indicative of a color, intensity, duration, and so forth.

A camera 344 generates sensor data 228 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The robot 104 may use image data acquired by the camera 344 for object recognition, navigation, collision avoidance, user communication, and so forth. For example, a pair of cameras 344 sensitive to infrared light may be mounted on the front of the robot 104 to provide binocular stereo vision, with the sensor data 228 comprising images being sent to the autonomous navigation module 220. In another example, the camera 344 may comprise a 10 megapixel or greater camera that is used for videoconferencing or for acquiring pictures for the user.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 220 may be acquired using a rolling shutter and subsequently may be processed to mitigate image artifacts. One or more microphones 346 may be configured to acquire information indicative of sound present in the physical environment 102. In some implementations, arrays of microphones 346 may be used. These arrays may implement beamforming techniques to provide for directionality of gain. The robot 104 may use the one or more microphones 346 to acquire information from acoustic tags, accept voice input from users, determine ambient noise level, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetector's or other light-sensitive elements that are used to determine one or more of the color, intensity, duration of ambient lighting around the robot 104.

An ambient temperature sensor 354 provides information indicative of the temperature of the ambient environment proximate to the robot 104. In some implementations, an infrared temperature sensor may be utilized to determine the temperature of another object at a distance.

A floor analysis sensor 356 may include one or more components that are used to generate at least a portion of the floor characterization data. In one implementation, floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 216, the autonomous navigation module 220, the task module 122, and so forth. For example, if the floor analysis sensor 356 determines that the floor is wet, the safety module 216 may decrease the speed of the robot 104 and generate a notification alerting the user.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 114 may include a radar 360. The radar 360 may be used to provide information as to a distance, lateral position, and so forth, to an object.

The sensors 114 may include a passive infrared (PIR) sensor 362. The PIR 362 may be used to detect the presence of people, pets, hotspots, and so forth. For example, the PIR 362 may be configured to detect infrared radiation with wavelengths between 8 and 14 micrometers.

The robot 104 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical environment 102 to provide landmarks for the autonomous navigation module 220. One or more touch sensors may be utilized to determine contact with a user or other objects.

The robot 104 may include one or more output devices 116. A motor 380 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the robot 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the robot 104 may include a haptic output device that provides output that produces particular touch sensations to the user. Continuing the example, a motor 380 with an eccentric weight may be used to create a buzz or vibration to allow the robot 104 to simulate the purr of a cat.

Figure 4:
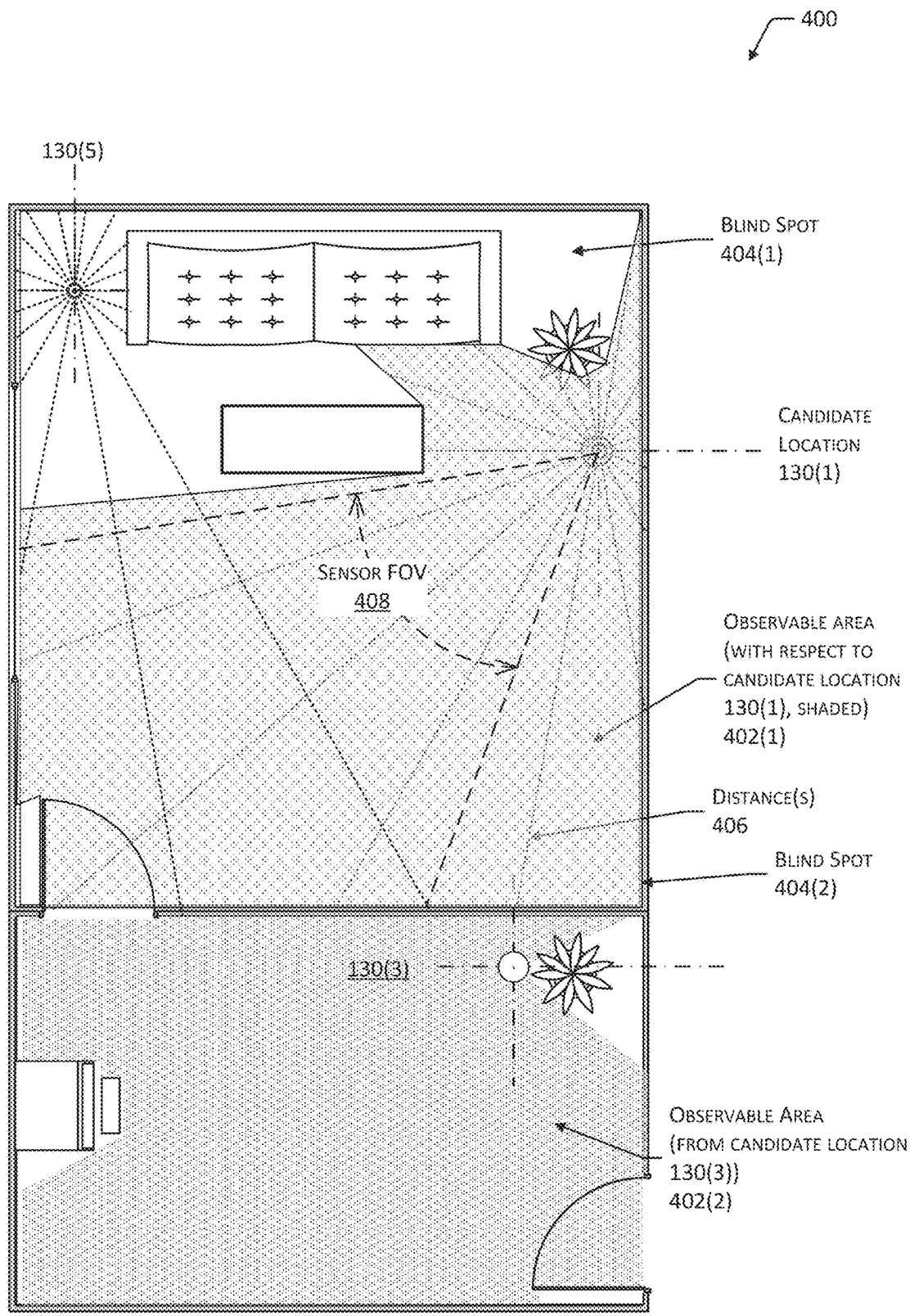
FIG. 4 illustrates a portion of an environment and fields of view that are available from different candidate locations, according to some implementations.

FIG. 4 illustrates a portion 400 of an environment 102 and a field of view that is available from different candidate locations 130, according to some implementations. In this illustration candidate locations 130(1), 130(3), and 130(5) are depicted. Only three candidate locations 130 shown in this figure for clarity. As described above, the candidate locations 130 may be distributed throughout the environment 102 at locations that are free from obstacles.

An observable area 402(1) is depicted with respect to candidate location 130(1) and observable area 402(2) with respect to candidate location 130(3). The observable area 402 is depicted as a shaded area. The observable area 402 may comprise the area within the environment 102 that is unobscured or otherwise unobstructed with respect to the candidate location 130. Areas that are obscured from the candidate location 130 are blind spots 404. For example, a blind spot 404(1) is formed with respect to candidate location 130(1) due to the presence of a plant and furniture. In one implementation, the FOV of the candidate location 130 may be assessed based on a value of this area, such as 2.73 square meters. In another implementation, a FOV of the candidate location 130 may be assessed using a sum of distances 406 extending from that candidate location 130 to an obstacle. For example, the occupancy map 120 (1) may be used and distances 406 may be determined along lines that extend from the candidate location 130 at particular angular intervals, such as every 20 degrees, to an obstacle, such as a wall or piece of furniture. A FOV score may be calculated by summing the distances 406 that emanate from a particular candidate location 130.

In some implementations the FOV score may be calculated for a subset of the entire FOV that is available. The FOV score may be calculated based on a maximum distance, total area, or total volume associated with a sensor FOV 408.

The sensor FOV 408 may comprise a solid angle within which a sensor 114, such as camera, is able to obtain data. The orientation of the robot 104 may be determined that maximizes the area within the sensor FOV 408.

The FOV may be assessed prior to the robot 104 arriving at the candidate location 130 or wait location 134. For example, the candidate location 130 may be associated with a location on the occupancy map 120(1) and may be used to calculate the FOV based on the data in the occupancy map 120(1). For example, a distance 406 may be calculated as a distance from the candidate location 130 to an area that has an obstacle value that exceeds a threshold value.

In some implementations the FOV may take into account the height of objects. For example, if the sensor 114 of the robot 104 is tall enough to "see" over a coffee table, the coffee table may not be deemed to obstruct the FOV of the robot 104.

The robot 104 may be positioned at the wait location 134 in a particular orientation. In one implementation, the orientation of the robot 104 may be determined such that a FOV of one or more sensors 114 on the robot 104 includes a largest area, such as a greatest portion of the environment 102. In another implementation, the FOV may be oriented with an orientation that includes an area in which one or more users are currently present, such as indicated by the current user location map 120(4). In another implementation, the FOV may be oriented such that the sensor FOV 408 includes an area in which one or more users have previously been, such as indicated by the movement map 120(3), the historical interaction location map 120(5), and so forth. The orientation may be calculated based at least in part using the occupancy map 120(1). For example, given a known angular value indicative of a FOV of a camera 344 on the robot 104, such as 135 degrees, and an orientation of that camera 344 with respect to a centerline of a chassis of the robot 104, the orientation may be determined that encompasses a largest area within the room. In other implementations the orientation may be determined based on other factors. For example, the robot 104 may be oriented at the wait location 134 with an orientation towards a center of the room, center of an open space within the room, towards a door, towards a particular piece of furniture, and so forth.

Figure 5:
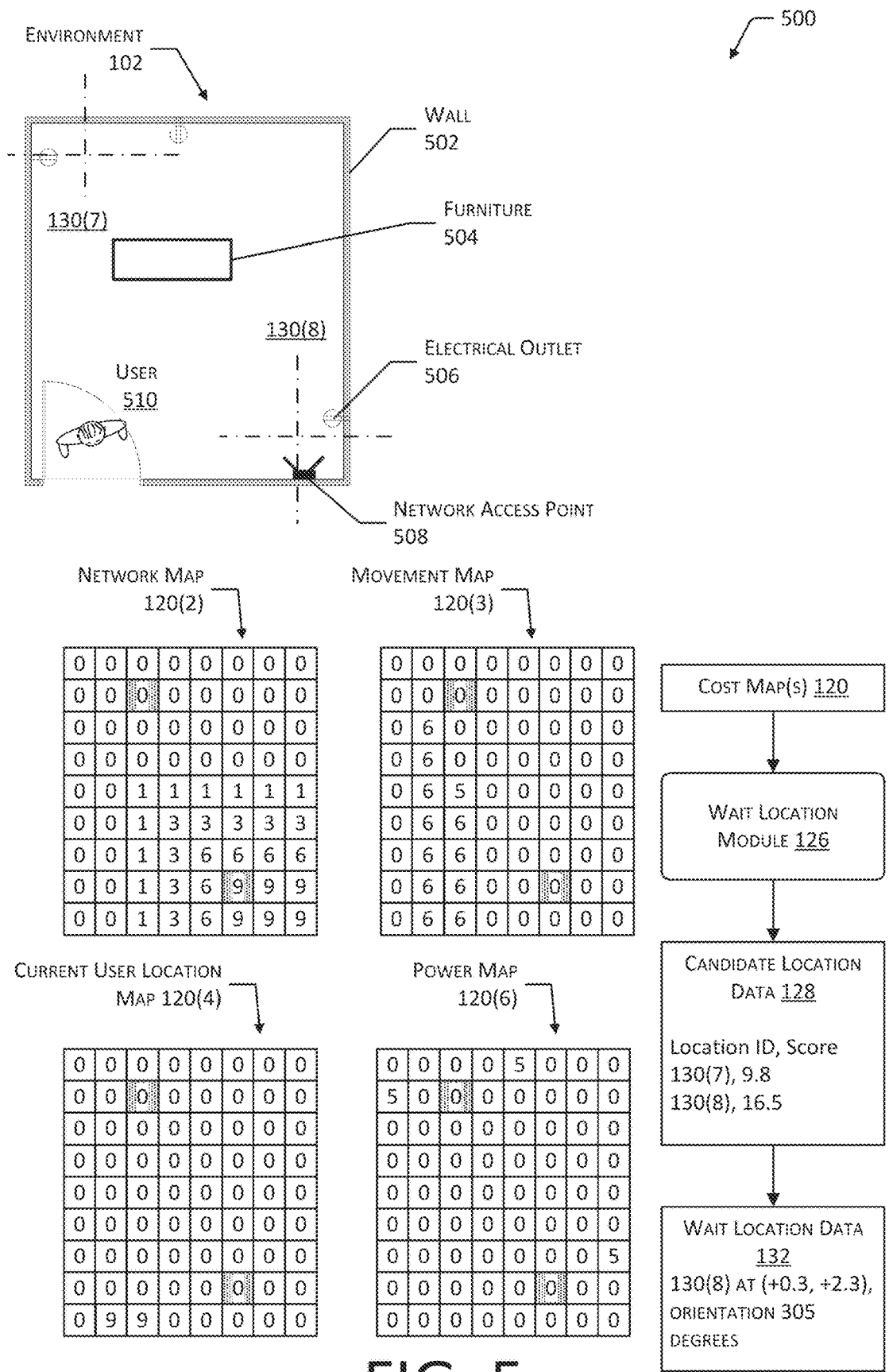
FIG. 5 illustrates several cost maps that may be used to determine a score for a candidate location, according to some implementations.

FIG. 5 illustrates several 500 cost maps 120 that may be used to determine a candidate score for a candidate location 130, according to some implementations. In this illustration, a simplified environment 102 is shown, with two candidate locations 130(7) and 130(8). As described above, more candidate locations 130 may be specified, but only two are shown here for clarity. The candidate locations 130 may be determined based at least in part on the occupancy map 120(1). For example, the candidate locations 130 are not within a wall 502, inside the boundaries of the furniture 504, and so forth.

The environment 102 includes walls 502, furniture 504, and electrical outlets 506. Also, in the environment 102 is a network access point 508, that may be used by the robot 104 to provide connectivity to the network 136. A user 510 is also shown within the environment 102.

As described above, the wait location module 126 may access one or more of the cost maps 120 and use the cost values they provide to determine candidate scores for the candidate locations 130. In this illustration, a network map 120(2), movement map 120(3), current user location map 120(4), and a power map 120(6) are depicted. Each cost map 120 comprises various areas, depicted as cells, and a cost value is shown within each area. The cells corresponding to the candidate locations 130(7) and 130(8) are shaded.

In this illustration, the candidate score comprises a sum of the cost values of that area in which the candidate location 130 is present, and for those in which the area has a zero value, a sum of a proportionate value of a closest non-zero cost value for a respective cost map 120 may be used. For example, the score for the candidate location 130(8) is described as:

Candidate Score for candidate location 130(8)=9+0+ 0+0+(6/3)+(9/3)+(5/2)=16.5.

In other implementations other operations may be performed to determine the cost. As described below, in some implementations weight values may be applied to one or more factors to determine the candidate score.

As illustrated here, the candidate location 130(8) has the greater candidate score, and is selected by the wait location module 126 for use as the wait location 134 as indicated by the wait location data 132. The wait location data 132 may also indicate the orientation of the robot 104 at the candidate location 130. For example, the orientation may be 305 degrees, as determined based on the FOV of that candidate location 130(8) and the field of view of sensors 114 on the robot 104.

In other implementations other combinations of cost maps 120 may be used. Also, the current location of the robot 104 may be considered. For example, the candidate score may be proportionate to an inverse of the distance to the respective candidate location 130. Continuing the example, a candidate location 130 that is closer may have a greater candidate score than one that is farther away.

The values of individual areas within the cost maps 120 depicted here are shown as fixed values by way of illustration and not necessarily as a limitation. In other implementations the values within the cost maps 120 may be varied based on factors such as the location of the robot 104, location of users 510, and so forth. For example, the power map 120(6) could be representative of relative values, such that the electrical outlet 506 that is closest to a candidate location 130 would have a greatest value, while the electrical outlet 506 that is furthest would have a lesser value. Continuing the example, the cost map 120 values are thus representative of the relative distance 406 from the robot 104 to a feature on the cost map 120.

FIG. 6 illustrates a table 600 of parameters 602 and weights 604 that may be applied to these parameters 602 to determine the candidate score for the candidate location 130, according to some implementations. While a table is depicted, it is understood that other data structures may be used to store this information. For example, the parameters 602 and their weights 604 may be included in executable code.

A parameter 602 may comprise a cost map 120, FOV, distance information, and so forth. The weight 604 may comprise a value that is used to calculate a portion of the candidate score that is associated with a particular parameter. For example, if priority is to be given to the ability to be near where users 510 have been traveling, the movement map 120(3) may be assigned a weight of "5", while a lesser weight of "1" is associated with the acoustic map 120(7). As a result, the cost values in the movement map 120(3) will contribute more greatly to the candidate score than those of the acoustic map 120(7). In some implementations a value associated with the parameter 602 may be multiplied by the weight 604.

In some implementations the weights 604 may comprise a function. For example, the parameter 602 of distance 406 of current location to candidate location 130 may have a weight 604 that is a reciprocal of the distance value. Continuing the example, if the distance 406 from the current location of the robot 104 to the candidate location 130 is 2.71 meters, then the score for that parameter may be 1/2.71, or 0.369.

Figure 7:
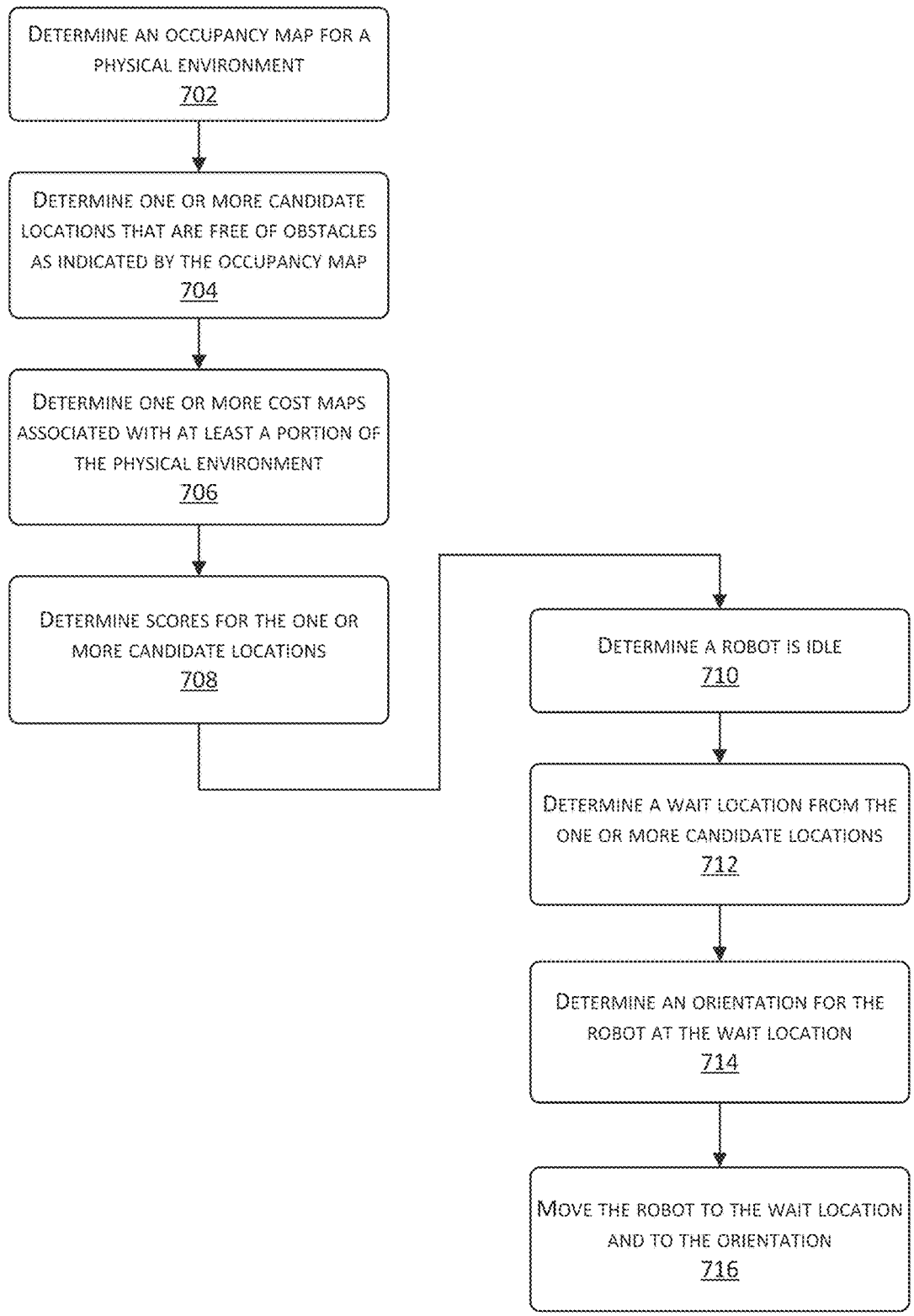
FIG. 7 is a flow diagram of a process to dynamically position an autonomous mobile device at a wait location, according to some implementations.

FIG. 7 is a flow diagram 700 of a process to dynamically position an autonomous mobile device at a wait location 134, according to some implementations. The process may be implemented at least in part by one or more of the processors 108 on the robot 104, the servers 140, the docking station 138, or other devices 142.

At 702 an occupancy map 120(1) for at least a portion of the physical environment 102 is determined. The occupancy map 120(1) may be indicative of placement of one or more obstacles that impede movement in the physical environment 102. In one implementation the occupancy map 120(1) comprises a plurality of cells with each cell of the plurality of cells representing a particular area in the physical environment 102 and having an obstacle cost value that is indicative of whether the cell is able to be traversed by the robot 104. For example, the occupancy map 120(1) may be indicative of a first area and a second area in the physical environment 102. The first area has a first obstacle cost value that is indicative of whether the first area contains an obstacle and the second area has a second obstacle cost value that is indicative of whether the second area contains an obstacle.

For example, image data obtained by one or more cameras 344 may be used to determine an occupancy map 120(1) of the physical environment 102 that is indicative of a first area and a second area in the physical environment 102. The first area may have a first obstacle cost value that is indicative of whether the first area contains an obstacle and the second area has a second obstacle cost value that is indicative of whether the second area contains an obstacle.

At 704 one or more candidate locations 130 are determined that are free of obstacles as indicated by the occupancy map 120(1). For example, a Sobol function may be used to pseudo randomly distribute potential candidate locations with respect to the occupancy map 120(1) or another representation of the environment 102. In other implementations, the potential candidate locations may be distributed in a regular pattern. The potential candidate locations that are located within an area that has an obstacle cost value exceeding a threshold value may be disregarded, and the remaining used as the candidate locations 130. In another implementation, the candidate locations 130 may be specified positions within a room, such as in corners formed by walls, manually specified by a user, and so forth.

Continuing the example, the first and second obstacle cost values may be below a threshold value, indicating that the first area within which the first candidate location 130(1) is located and the second area within which the second candidate location 130(2) is located are free from obstacles.

At 706 one or more of cost maps 120 associated with at least a portion of the environment 102 are determined. For example, the mapping module 118 may generate cost maps 120 such as the network map 120(2), movement map 120(3), and so forth. The cost maps 120 may not provide cost values for all areas within the environment 102. For example, the network map 120(2) may not have a cost value indicative of a received signal strength value for every area on the map. In some implementations the cost maps 120 may use data obtained at some areas to infer or interpolate the values at other areas.

At 708 scores are determined for the one or more candidate locations 130. In one implementation the scores may comprise a sum of the cost map values of the cost maps 120 for the area the candidate location 130 is within. The cost values associated with a particular cost map 120 or other parameters 602 may be weighted. For example, a particular parameters 602 may be multiplied by a weight 604. The cost values may be summed, or the product of the values and their weights 604 may be summed to determine the score for the candidate location 130.

In one implementation, at least a portion of the score for a candidate location 130 may be calculated by determining a current location of the robot 104 and a distance from the current location to the candidate location 130. The score for that candidate location 130 may be based on the distance 406. For example, a factor in the score may be inversely proportionate to the distance 406, such that as the distance increases, the score decreases.

In another implementation, at least a portion of the score for a candidate location 130 may be calculated by determining a distance 406 from the candidate location 130 to a nearest source of electrical power accessible to the robot 104, such as an electrical outlet 506, a docking station 138, charging station, and so forth. The score for that candidate location 130 may be based on the distance 406. For example, a factor in the score may be inversely proportionate to the distance 406, such that as the distance 406 between the candidate location 130 and the source of electrical power increases, the score decreases.

In another implementation, at least a portion of the score for a candidate location 130 may be calculated by determining a distance 406 from the candidate location 130 to a closest wall 502. The score for that candidate location 130 may be based on the distance. For example, a factor in the score may be inversely proportionate to the distance, such that as the distance 406 between the candidate location 130 and the closest wall 502 increases, the score decreases.

In another implementation, at least a portion of the score for a candidate location 130 may be calculated using cost values from a network map 120(2). For example, the network map 120(2) may comprise cost values indicative of signal strength values in at least some of the areas of a wireless network that is accessible by a wireless network interface 110 of the robot 104.

In another implementation, at least a portion of the score for a candidate location 130 may be calculated using cost values from a movement map 120(3), current user location map 120(4), historical interaction location map 120(5), and so forth.

The score may also be based at least in part on the FOV afforded by the candidate location 130. For example, as described above with regard to FIG. 4, a candidate location 130 that provides a line of sight to a larger observable area 402 may have a greater value of this portion of the score.

At 710 the robot 104 is determined to be idle. In one implementation, the wait location module 126 may determine that there is no task in the task queue data 238 that is currently pending or is scheduled for execution within a threshold value of time from the current time. In another implementation the wait location module 126 may determine that a threshold amount of time has passed since a last task was completed, and no task is in the task queue data 238. In some implementations, the idle determination may be based at least in part on a battery charge level. For example, if the battery charge level is below a threshold value, the robot 104 may initiate a task to recharge. If the battery charge level exceeds the threshold value and no other tasks are pending or scheduled within the threshold value of time, the robot 104 may be idle.

In other implementations the robot 104 may be idled as a result of a command from a user 510. For example, the user 510 may issue a command to the robot 104 to stop all tasks, wait, and so forth. The robot 104 may then be deemed to be idle.

At 712, a wait location 134 is determined from the one or more candidate locations 130 in the candidate location data 128. For example, sub-scores from the various parameters 602 of a particular candidate location 130 may be summed to produce the score for that particular candidate location 130. The wait location 134 that has a greatest score may be selected as the wait location 134, and wait location data 132 may be generated that is indicative of that. The wait location data 132 may include information indicative of an orientation for the robot 104 to assume at the wait location 134.

At 714, an orientation for the robot 104 at the wait location 134 is determined. The orientation for the wait location 134 or the candidate location 130 may be based at least in part on a FOV associated with the wait location 134. In one implementation, data indicative of the sensor FOV 408 for one or more sensors 114 onboard the robot 104 may be retrieved from memory 112. In one implementation various candidate orientations may be tested. For example, a first candidate orientation of the robot 104 and a second candidate orientation may be determined. For the first candidate orientation and limited to the field of view, a first plurality of distances 406 of lines extending from the selected candidate location 130 to one or more obstacles indicated by the occupancy map 120(1) may be determined. A first sum of the first plurality of distances 406 is determined. For the second candidate orientation and limited to the field of view, a second plurality of distances 406 of lines extending from the selected candidate location 130 to one or more obstacles indicated by the occupancy map 120(1) is determined. A second sum of the second plurality of distances 406 is determined. The robot 104 may be assigned an orientation that corresponds to the candidate orientation that has the greatest sum.

In another implementation, the orientation may be determined based on the presence of users 510, orienting the robot 104 such that the sensor FOV 408 includes the users 510, so the robot 104 is able to acquire sensor data about the users 510. In this implementation, data indicative of the sensor FOV 408 for one or more sensors 114 onboard the robot 104 is retrieved from memory 112. A presence of one or more users 510 in the physical environment 102 is determined. The robot 104 is oriented at the wait location 134 to place a majority of the one or more users 510 within the sensor FOV 408.

At 716 the robot 104 is moved to the wait location 134 specified by the wait location data 132. The robot 104 may also be positioned into the determined orientation. In some implementations, if the robot 104 remains idle at the wait location 134 for a threshold amount of time, the robot 104 may move to another wait location 134. The weights 604 used to determine the scores for candidate locations 130 in this situation may be varied. For example, if the robot 104 is idle for thirty minutes, the weight 604 for the movement map 120(3) or the historical interaction location map 120(5) may be increased, resulting in the robot 104 moving to a wait location 134 that is closer to where users 510 may be.

In other implementations the process may be implemented in different orders. For example, the determination that the robot 104 is idle as described at 710 may occur before the determination of the scores for the one or more candidate locations 130 as described at 708.

Figure 8:
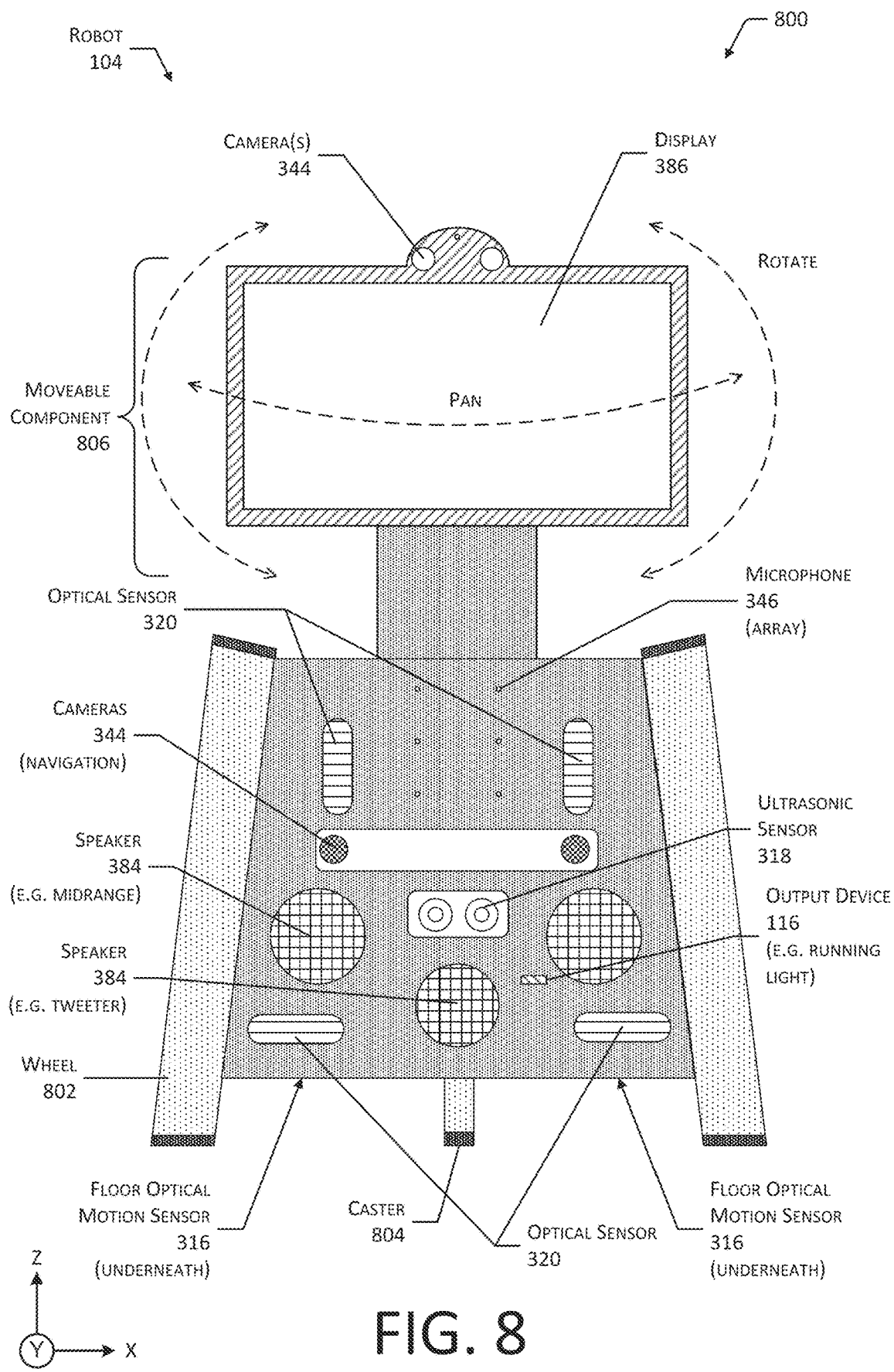
FIG. 8 is a front view of the robot, according to some implementations.

FIG. 8 is a front view 800 of the robot 104, according to some implementations. In this view, the wheels 802 are depicted on the left and right sides of a lower structure. As illustrated here, the wheels 802 are canted inwards towards an upper structure. In other implementations, the wheels 802 may be mounted vertically. The caster 804 is visible along the midline. The front section of the robot 104 includes a variety of sensors 114. A first pair of optical sensors 320 are located along the lower edge of the front while a second pair of optical sensors 320 are located along an upper portion of the front. Between the second set of the optical sensors 320 is a microphone 346 (array).

In some implementations, one or more microphones 346 may be arranged within or proximate to the display 386. For example, a microphone 346 array may be arranged within the bezel of the display 386.

A pair of cameras 344 separated by a distance are mounted to the front of the robot 104 and provide for stereo vision. The distance or "baseline" between the pair of cameras 344 may be between 5 and 15 centimeters (cm). For example, the pair of cameras 344 may have a baseline of 10 cm. In some implementations, these cameras 344 may exhibit a relatively wide horizontal field-of-view (HFOV). For example, the HFOV may be between 90° and 110°. A relatively wide FOV allows for easier detection of moving objects, such as users or pets that may be in the path of the robot 104. Also, the relatively wide FOV facilitates the robot 104 being able to detect objects when turning.

The sensor data 228 comprising images produced by this pair of cameras 344 can be used by the autonomous navigation module 220 for navigation of the robot 104. The cameras 344 used for navigation may be of different resolution from, or sensitive to different wavelengths than, cameras 344 used for other purposes such as video communication. For example, the navigation cameras 344 may be sensitive to infrared light allowing the robot 104 to operate in darkness, while the camera 344 mounted above the display 386 may be sensitive to visible light and is used to generate images suitable for viewing by a person. Continuing the example, the navigation cameras 344 may have a resolution of at least 300 kilopixels each while the camera 344 mounted above the display 386 may have a resolution of at least 10 megapixels. In other implementations, navigation may utilize a single camera 344.

The robot 104 may comprise a moveable component 806. In one implementation, the moveable component 806 may include the display 386 and cameras 344 arranged above the display 386. The cameras 344 may operate to provide stereoimages of the physical environment 102, the user, and so forth. For example, an image from each of the cameras 344 above the display 386 may be accessed and used to generate stereo image data about a face of a user. This stereo image data may then be used for facial recognition, user identification, gesture recognition, gaze tracking, and so forth. In other implementations, a single camera 344 may be present above the display 386.

The moveable component 806 is mounted on a movable mount that allows for movement with respect to the chassis of the robot 104. The movable mount may allow the moveable component 806 to be moved by the moveable component actuators 392 along one or more degrees of freedom. For example, the moveable component 806 may pan, tilt, and rotate as depicted here. The size of the moveable component 806 may vary. In one implementation, the display 386 in the moveable component 806 may be approximately 8 inches as measured diagonally from one corner to another.

An ultrasonic sensor 318 is also mounted on the front of the robot 104 and may be used to provide sensor data 228 that is indicative of objects in front of the robot 104.

One or more speakers 384 may be mounted on the robot 104. For example, pyramid range speakers 384 are mounted on the front of the robot 104 as well as a high range speaker 384 such as a tweeter. The speakers 384 may be used to provide audible output such as alerts, music, human speech such as during a communication session with another user, and so forth.

One or more bumper switches 314 (not shown) may be present along the front of the robot 104. For example, a portion of the housing of the robot 104 that is at the leading edge may be mechanically coupled to one or more bumper switches 314.

Other output devices 116, such as one or more lights 382, may be on an exterior of the robot 104. For example, a running light 382 may be arranged on a front of the robot 104. The running light 382 may provide light for operation of one or more of the cameras 344, a visible indicator to the user 510 that the robot 104 is in operation, and so forth.

One or more of the FOMS 316 are located on an underside of the robot 104.

Figure 9:
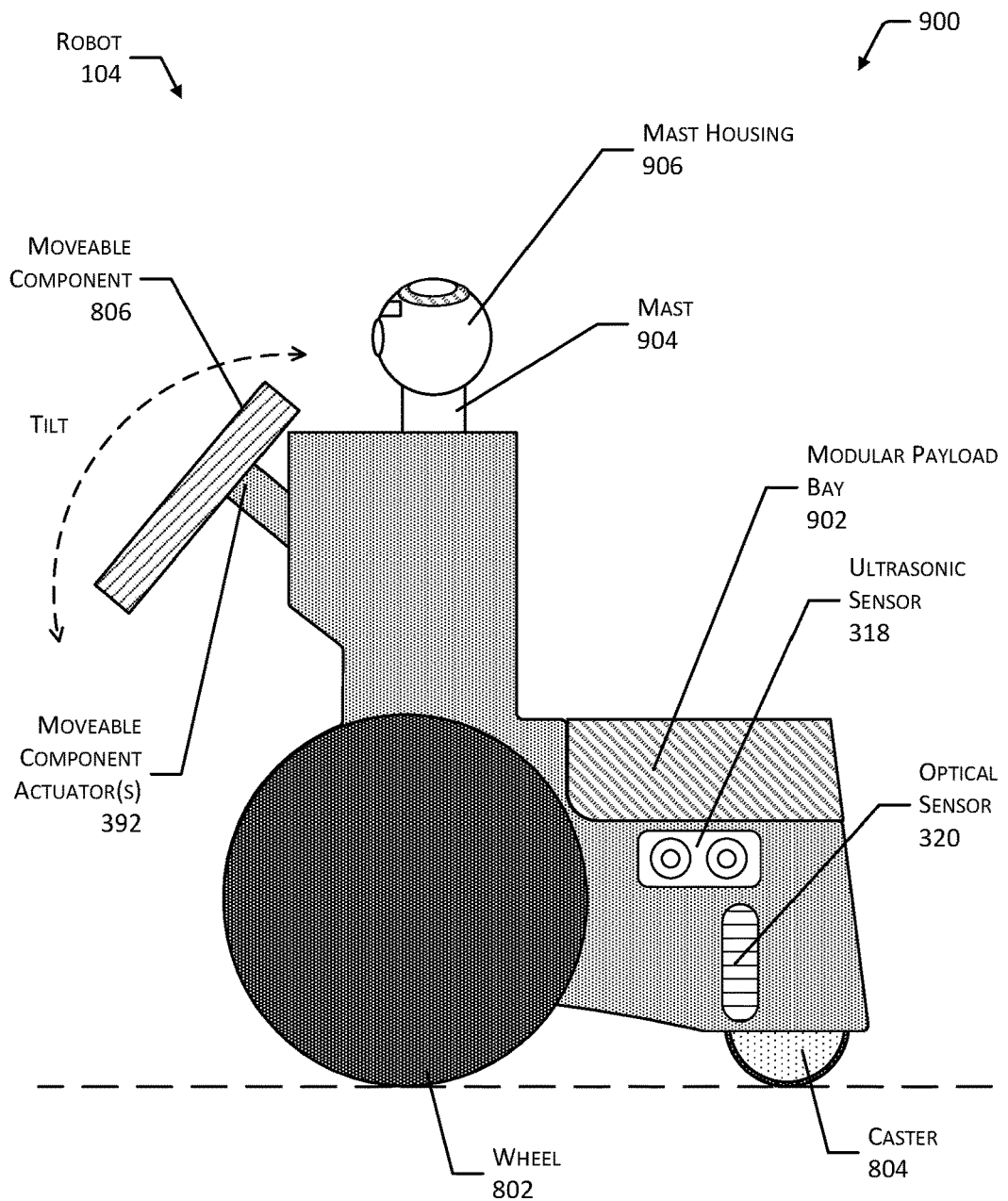
FIG. 9 is a side view of the robot, according to some implementations.

FIG. 9 is a side view 900 of the robot 104, according to some implementations.

The exterior surfaces of the robot 104 may be designed to minimize injury in the event of an unintended contact between the robot 104 and a user or a pet. For example, the various surfaces may be angled, rounded, or otherwise designed to divert or deflect an impact. In some implementations, the housing of the robot 104, or a surface coating may comprise an elastomeric material or a pneumatic element. For example, the outer surface of the housing of the robot 104 may be coated with a viscoelastic foam. In another example, the outer surface of the housing of the robot 104 may comprise a shape-memory polymer that upon impact deforms but then over time returns to the original shape.

In this side view, the left side of the robot 104 is depicted. An ultrasonic sensor 318 and an optical sensor 320 are present on either side of the robot 104.

In this illustration, the caster 804 is shown in a trailing configuration, in which the caster 804 is located behind or aft of the axle of the wheels 802. In another implementation (not shown) the caster 804 may be in front of the axle of the wheels 802. For example, the caster 804 may be a leading caster 804 positioned forward of the axle of the wheels 802.

The robot 104 may include a modular payload bay 902 located within the lower structure. The modular payload bay 902 provides one or more of mechanical or electrical connectivity with robot 104. For example, the modular payload bay 902 may include one or more engagement features such as slots, cams, ridges, magnets, bolts, and so forth that are used to mechanically secure an accessory within the modular payload bay 902. In one implementation, the modular payload bay 902 may comprise walls within which the accessory may sit. In another implementation, the modular payload bay 902 may include other mechanical engagement features such as slots into which the accessory may be slid and engage.

The modular payload bay 902 may include one or more electrical connections. For example, the electrical connections may comprise a universal serial bus (USB) connection that allows for the transfer of data, electrical power, and so forth between the robot 104 and the accessory.

As described above, the robot 104 may incorporate a moveable component 806 that includes a display 386 which may be utilized to present visual information to the user 510.

In some implementations, the moveable component 806 may be located with or affixed to the upper structure. In some implementations, the display 386 may comprise a touch screen that allows user input to be acquired. The moveable component 806 is mounted on a movable mount that allows motion along one or more axes. For example, the movable mount may allow the moveable component 806 to be panned, tilted, and rotated by the moveable component actuators 392. The moveable component 806 may be moved to provide a desired viewing angle to the user, to provide output from the robot 104, and so forth. For example, the output may comprise the moveable component 806 being tilted forward and backward to provide a gestural output equivalent to a human nodding their head, or panning to face the user.

The robot 104 may incorporate a mast 904. The mast 904 provides a location from which additional sensors 114 or output devices 116 may be placed at a higher vantage point. The mast 904 may be fixed or extensible. The extensible mast 904 is depicted in this illustration. The extensible mast 904 may be transitioned between a retracted state, an extended state or placed at some intermediate value between the two.

At the top of the mast 904 may be a mast housing 906. In this illustration, the mast housing 906 is approximately spherical, however in other implementations other physical form factors such as cylinders, squares, or other shapes may be utilized.

The mast housing 906 may contain one or more sensors 114. For example, the sensors 114 may include a camera 344 having a field-of-view (FOV). In another example, the sensors 114 may include an optical sensor 320 to determine a distance to an object. The optical sensor 320 may look upward, and may provide information as to whether there is sufficient clearance above the robot 104 to deploy the mast 904. In another example, the mast housing 906 may include one or more microphones 346.

One or more output devices 116 may also be contained by the mast housing 906. For example, the output devices 116 may include a camera flash used to provide illumination for the camera 344, an indicator light that provides information indicative of a particular operation of the robot 104, and so forth.

Other output devices 116, such as one or more lights 382, may be elsewhere on an exterior of the robot 104. For example, a light 382 may be arranged on a side of the upper structure.

In some implementations, one or more of the sensors 114, output device 116, or the mast housing 906 may be movable. For example, the motor 380 may allow for the mast 904, the mast housing 906, or combination thereof to be panned allowing the FOV to move from left to right.

In some implementations, the moveable component 806 may be mounted to the mast 904. For example, the moveable component 806 may be affixed to the mast housing 906. In another example, the moveable component 806 may be mounted to a portion of the mast 904, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A robot comprising:
   a camera;
   one or more motors coupled to one or more wheels;
   one or more memories storing first computer-executable instructions;
   a wireless network interface; and
   one or more processors to execute the first computer-executable instructions to:
     acquire, using the camera, image data of a physical environment of the robot;
     determine, using the image data, an occupancy map associated with the physical environment;
     determine, using the image data, one or more cost maps associated with the physical environment, the one or more cost maps comprising at least:
       indicative of availability of a wireless network, an acoustic map indicative of sound levels measured in different areas of the physical environment, an exclusion map indicative of where in the physical environment the robot is prohibited from travelling, an ambient light map indictive of how bright different areas of the physical environment are, or a personality map indicative of particular areas of the physical environment that are preferred for travel by the robot;

determine, using an occupancy map, a first candidate location in the physical environment and a second candidate location in the physical environment;

determine a first score of the first candidate location based on the one or more cost maps;

determine a second score of the second candidate location based on the one or more cost maps;

determine the second score is greater than the first score;

determine the robot is not currently performing a task;

select the second candidate location as a wait location for the robot, based on the second score being greater than the first score; and move the robot to the wait location in response to determining the robot is not currently performing a task.

2. The robot of claim 1, the one or more processors to further execute the first computer-executable instructions to:
determine a field of view of the camera;
determine a first orientation of the robot with respect to the second candidate location;
determine a first area encompassed by the field of view of the camera in the first orientation;
determine a second orientation of the robot with respect to the second candidate location;
determine a second area encompassed by the field of view of the camera in the second orientation;
determine the second area is greater than the first area; and
orient the robot at the second candidate location to the second orientation.

3. A method performed by a set of processors associated with a robot, the method comprising:
acquiring, using a camera of the robot, image data of a physical environment of the robot;
determining, using at least the image data, an occupancy map associated with the physical environment;
determining a first location in the physical environment based on the occupancy map;
determining a second location in the physical environment based on the occupancy map;
determining one or more cost maps associated with the physical environment, the one or more cost maps comprising at least:
an exclusion map indicative of areas in the physical environment where the robot is prohibited from traveling,
an ambient light map indicative of how bright areas of the physical environment are, or
a personality map indicative of areas of the physical environment that are preferred for travel by the robot;
determining a first score for the first location based on the one or more cost maps;
determining a second score for the second location based on the one or more cost maps;
determining the robot is not currently performing a task;

determining a wait location for the robot based on one or more of the first score or the second score; and
moving the robot to the wait location using one or more motors coupled to one or more wheels of the robot, responsive to the determining the robot is not currently performing a task.

4. The method of claim 3, further comprising:
determining a current location of the robot;
determining a first distance from the current location to the first location, wherein the first score is based at least in part on the first distance; and
determining a second distance from the current location to the second location, wherein the second score is based at least in part on the second distance.

5. The method of claim 3, further comprising:
determining a first distance from the first location to a source of electrical power accessible by the robot, wherein the first score is based at least in part on the first distance; and
determining a second distance from the second location to the source of electrical power accessible by the robot, wherein the second score is based at least in part on the second distance.

6. The method of claim 3, further comprising:
determining a first distance from the first location to a closest wall as indicated by the occupancy map, wherein the first score is based at least in part on the first distance; and
determining a second distance from the second location to the closest wall as indicated by the occupancy map, wherein the second score is based at least in part on the second distance.

7. The method of claim 3, wherein one of the one or more cost maps is indicative of signal strength values in one or more areas; and the method further comprising:
determining a first signal strength value at the first location, wherein the first score is based at least in part on the first signal strength value; and
determining a second signal strength value at the second location, wherein the second score is based at least in part on the second signal strength value.

8. The method of claim 3, wherein one of the one or more cost maps is indicative of one or more areas within the physical environment in which human motion was detected.

9. The method of claim 3, wherein one of the one or more cost maps is indicative of a count of previous interactions between a user and the robot.

10. The method of claim 3, further comprising:
determining that a first acoustic sound level at the first location exceeds a threshold value;
wherein the wait location is the second location; and
wherein the second location has a second acoustic sound level that is lower than the threshold value.

11. The method of claim 3, wherein the wait location is the first location, and the method further comprising:
determining a field of view of one or more sensors onboard the robot;
determining a first orientation of the robot at the first location;
determining, for the first orientation and the field of view, a first plurality of distances extending from the first location to one or more obstacles indicated by the occupancy map;
determining a first sum of the first plurality of distances;
determining a second orientation of the robot at the first location;

determining, for the second orientation and the field of view, a second plurality of distances extending from the first location to one or more obstacles indicated by the occupancy map;
determining a second sum of the second plurality of distances;
determining the second sum is greater than the first sum; and
orienting the robot at the first location with the second orientation.

12. The method of claim 3, wherein the wait location is the first location, and the method further comprising:
determining a presence of one or more users in the physical environment; and
orienting the robot at the first location to place a majority of the one or more users within a field of view of one or more sensors of the robot.

13. The method of claim 3, wherein the determining the robot is not currently performing a task further comprises:
determining no task is currently pending for execution within a threshold value of time from a current time; and
determining a battery charge level of the robot exceeds a threshold value.

14. A method performed by a set of processors associated with a robot, the method comprising:
acquiring, using a camera of the robot, image data of a physical environment of the robot;
determining, using at least the image data, an occupancy map associated with the physical environment;
determining, using at least the image data, one or more cost maps associated with the physical environment;
determining a first location in the physical environment based on the occupancy map;
determining a second location in the physical environment based on the occupancy map;
determining a first score for the first location based on the one or more cost maps;
determining a second score for the second location based on the one or more cost maps;
determining the first score is greater than the second score;
determining the first location is a wait location for the robot based on the first score being greater than the second score;
determining the robot is not currently performing a task; and
moving the robot to the wait location using one or more motors coupled to one or more wheels of the robot, based on the determining that the robot is not currently performing a task.

15. The method of claim 14, wherein the one or more cost maps comprise cost values that are indicative of one or more of:
obstacles in the physical environment;
wireless network received signal strength in the physical environment;
current location of a first user;
previous location of a second user that was moving;
previous interaction between a user and the robot;
a location of electrical power accessible by the robot; or
ambient acoustic noise level.

16. The method of claim 14, the determining the first score comprising a sum of:
a product of a first weight and a first distance from the first location to a closest charging station;
a product of a second weight and a second distance from the first location to a closest wall;
a product of a third weight and a sum of cost values indicative of prior user interactions with the robot that are within line of sight of the first location; and
a product of a fourth weight and a sum of cost values indicative of user presence within the line of sight of the first location.

17. The method of claim 14, further comprising determining an orientation of the robot at the first location, the determining the orientation comprising:
determining a field of view of one or more sensors onboard the robot;
determining, for the first location, a first orientation that exhibits a greatest area in the physical environment that is encompassed by the field of view; and
wherein the first score is based at least in part on the greatest area associated with the first location.

18. The method of claim 14, further comprising determining an orientation of the robot at the first location, the determining the orientation comprising:
determining the orientation at the first location that encompasses a greatest area in the physical environment in a field of view.

19. The method of claim 14, further comprising:
determining a current location of the robot;
determining a distance from the current location to the first location; and
wherein the first score is based on the distance.

20. The method of claim 14, wherein one of the one or more cost maps is indicative of signal strength values in at least one or more areas; and the method further comprising:
determining a first signal strength value at the first location, wherein the first score is based at least in part on the first signal strength value; and
determining a second signal strength value at the second location, wherein the second score is based at least in part on the second signal strength value.

21. A robot comprising:
a camera;
one or more wheels;
a memory storing computer-executable instructions; and
a hardware processor configured to execute the computer-executable instructions to:
acquire image data of an environment of the robot, using the camera;
determine an occupancy map associated with the environment, using at least the image data;
determine a first location in the environment based on the occupancy map;
determine a second location in the environment based on the occupancy map;
determine one or more cost maps associated with the environment, the one or more cost maps comprising at least:
an exclusion map indicative of areas in the physical environment where the robot is prohibited from traveling,
an ambient light map indicative of how bright areas of the physical environment are, or
a personality map indicative of areas of the physical environment that are preferred for travel by the robot;
determine a first score for the first location, based on the one or more cost maps;
determine a second score for the second location, based on the one or more cost maps;

determine the robot is not currently performing a task;
determine a wait location for the robot based on one or more of the first score or the second score; and
move the robot to the wait location using the one or more wheels, in response to determining the robot is not currently performing a task.

\* \* \* \* \*

UNITED STATES PATENT AND TRADEMARK OFFICE
CERTIFICATE OF CORRECTION

| | | |
|---|---|---|
| PATENT NO. | : 11,567,504 B1 | Page 1 of 1 |
| APPLICATION NO. | : 16/128785 | |
| DATED | : January 31, 2023 | |
| INVENTOR(S) | : Shi Bai et al. | |

It is certified that error appears in the above-identified patent and that said Letters Patent is hereby corrected as shown below:

In the Claims

Column 34, Claim 1, Line 67:
Currently reads: "indicative of availability of a wireless network,"
Where it should read: --a network map indicative of availability of a wireless network,--.

Signed and Sealed this
Seventh Day of March, 2023

*Katherine Kelly Vidal*

Katherine Kelly Vidal
*Director of the United States Patent and Trademark Office*